US012811849B2

(12) United States Patent
Narita

(10) Patent No.: US 12,811,849 B2
(45) Date of Patent: Nov. 24, 2026

(54) OUTPUTTING INFORMATION TO COMMUNICATION APPARATUS

(71) Applicant: BROTHER KOGYO KABUSHIKI KAISHA, Nagoya (JP)

(72) Inventor: Yuki Narita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 298 days.

(21) Appl. No.: 18/777,824

(22) Filed: Jul. 19, 2024

(65) Prior Publication Data

US 2025/0080412 A1 Mar. 6, 2025

(30) Foreign Application Priority Data

Aug. 30, 2023 (JP) ................................ 2023-140578

(51) Int. Cl.
*H04L 41/0803* (2022.01)

(52) U.S. Cl.
CPC ................................ *H04L 41/0803* (2013.01)

(58) Field of Classification Search
CPC .................................................. H04L 41/0803
See application file for complete search history.

(56) References Cited

U.S. PATENT DOCUMENTS

| | | | | |
|---|---|---|---|---|
| 2006/0056605 A1* | 3/2006 | Whitfield | H04M 11/002 | 379/106.01 |
| 2015/0149523 A1* | 5/2015 | Nakamura | H04L 67/55 | 709/201 |
| 2015/0149524 A1* | 5/2015 | Nishikawa | H04L 12/2803 | 709/201 |
| 2015/0149536 A1* | 5/2015 | Nishikawa | H04L 67/34 | 709/219 |
| 2023/0164213 A1* | 5/2023 | Narita | H04L 67/1036 | 709/226 |

FOREIGN PATENT DOCUMENTS

| | | | | |
|---|---|---|---|---|
| JP | 2002271323 A * | 9/2002 | | |
| JP | 2015133048 A * | 7/2015 | | |
| JP | 2018201208 A * | 12/2018 | H04W 52/0251 | |
| JP | 2023-76038 A | 6/2023 | | |
| WO | WO-2018148680 A1 * | 8/2018 | H01Q 9/065 | |

* cited by examiner

*Primary Examiner* — Philip C Lee
(74) *Attorney, Agent, or Firm* — Scully, Scott, Murphy & Presser, P. C.

(57) ABSTRACT

A processing server determines apparatus state information indicating a state of a communication apparatus, determines a target connection server from among a plurality of connection servers by using the apparatus state information and a plurality of server state information, outputs, to the communication apparatus, connection information for connection with the target connection server, acquires update information indicating an update of the state of the communication apparatus without receiving an instruction from the communication apparatus, in response to acquiring the update information after establishment of always-on connection between the communication apparatus and the target connection server, determines updated apparatus state information by using the update information, and in a case where a particular condition is satisfied, determines an updated target connection server from among the plurality of connection servers, and outputs, to the communication apparatus, updated connection information for connection with the updated target connection server.

12 Claims, 14 Drawing Sheets

FIG. 2

301

| CLUSTER IDENTIFIER | SERVER LABEL INFORMATION SI | | |
|---|---|---|---|
| | REGION GG | MODEL GJ | MONITORING FREQUENCY GL |
| C1 | GG1 | GJ1 | GLL |
| C2 | GG1 | GJ1 | GLH |
| C3 | GG1 | GJ2 | GLL |
| C4 | GG1 | GJ2 | GLH |
| C5 | GG2 | GJ1 | GLL |
| C6 | GG2 | GJ1 | GLH |
| C7 | GG2 | GJ2 | GLL |
| C8 | GG2 | GJ2 | GLH |
| ⋮ | ⋮ | ⋮ | ⋮ |

402

| SERVICE GA | TARGET MONITORING FREQUENCY tGL |
|---|---|
| NONE | GLL |
| INFORMATION ACQUISITION (CONSUMABLE AUTOMATIC ORDER) | GLL |
| REMOTE PRINT | GLH |
| REMOTE SCAN | GLH |
| ⋮ | ⋮ |

FIG. 7

302

| CLUSTER IDENTIFIER | COMMUNICATION APPARATUS IDENTIFIER |
|---|---|
| C1 | T1, T2 ... |
| C2 | T3, T4 ... |
| C3 | T5, T6 ... |
| C4 | T7, T8 ... |
| ⋮ | ⋮ |

FIG. 11
402b
| ITEM | STATE | TARGET MONITORING FREQUENCY tGL |
|---|---|---|
| (GB) PRINT FREQUENCY | NP < NPth | GLL |
| | NP ≥ NPth | GLH |
| (GC) COMMUNICATION FREQUENCY (API USE FREQUENCY) | F1 < F1th | GLL |
| | F1 ≥ F1th | GLH |
| (GI) USE FREQUENCY FOR EACH USER | F3 < F3th | GLL |
| | F3 ≥ F3th | GLH |
FIG. 12A
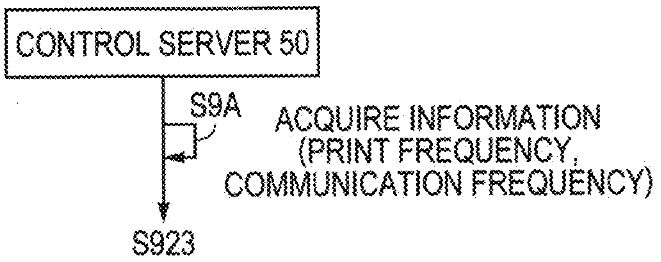
FIG. 12B
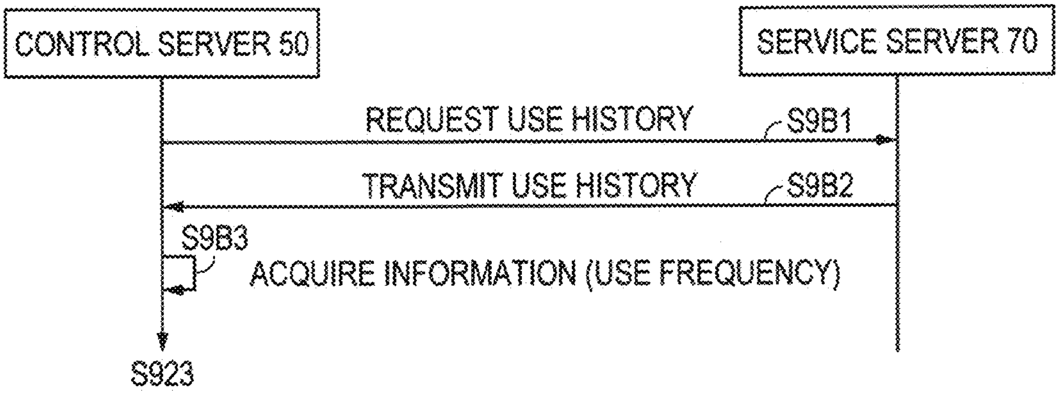
FIG. 12C
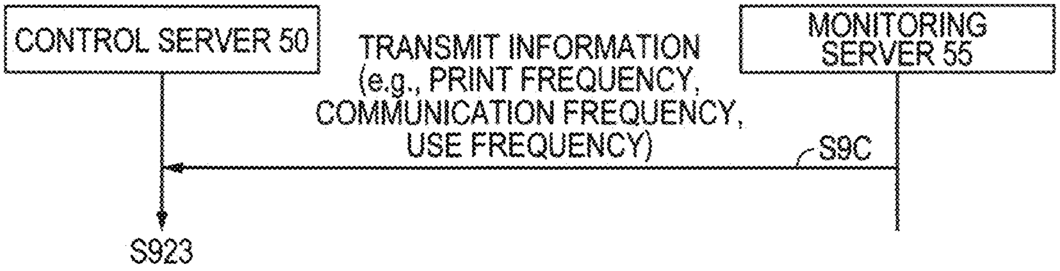

FIG. 13

| INFORMATION TYPE | ITEM | ACQUISITION METHOD | RULE FOR DETERMINING LABEL INFORMATION TO BE ASSIGNED TO CLUSTER |
|---|---|---|---|
| SERVICE INFORMATION | (GA) REGISTRATION SERVICE<br>e.g.,<br>(GA1) REMOTE PRINT<br>(GA2) REMOTE SCAN<br>(GA3) INFORMATION ACQUISITION | ACQUIRE INFORMATION FROM SERVICE SERVER | (RA1) ALLOCATE PARTICULAR SERVICE TO A PLURALITY OF CLUSTERS |
| | | | (RA2) ALLOCATE DIFFERENT CLUSTER TO EACH SERVICE |
| | (GB) PRINT FREQUENCY<br>e.g.,<br>(GB1) $NP \geq NPth$<br>(GB2) $NP < NPth$ | ACQUIRE INFORMATION FROM SERVICE SERVER | (RB1) ALLOCATE FIRST GROUP GB1 TO A PLURALITY OF CLUSTERS |
| | | | (RB2) ALLOCATE DIFFERENT CLUSTER TO EACH GROUP |
| HISTORY INFORMATION | (GC) COMMUNICATION FREQUENCY<br>e.g.,<br>(GC1) $F1 \geq F1th$<br>(GC2) $F1 < F1th$ | ACQUIRE INFORMATION FROM CONTROL SERVER | (RC1) ALLOCATE EACH GROUP TO A PLURALITY OF CLUSTERS SO AS TO REDUCE DEVIATION OF USE FREQUENCY F1 |
| | | | (RC2) ALLOCATE DIFFERENT CLUSTER TO EACH GROUP |

FIG. 14

| INFORMATION TYPE | ITEM | ACQUISITION METHOD | RULE FOR DETERMINING LABEL INFORMATION TO BE ASSIGNED TO CLUSTER |
|---|---|---|---|
| HISTORY INFORMATION | (GD) ERROR FREQUENCY<br>e.g.,<br>(GD1) FE ≥ FEth<br>(GD2) FE < FEth | ACQUIRE INFORMATION FROM CONTROL SERVER | (RD1) ALLOCATE FIRST GROUP GD1 TO PARTICULAR CLUSTER |
| | (GE) PAST SIMULTANEOUS DISCONNECTION ADDRESS GROUP<br>e.g.,<br>(GE1) FIRST GROUP<br>(GE2) SECOND GROUP | ACQUIRE INFORMATION FROM CONTROL SERVER | (RE1) ALLOCATE FIRST GROUP GE1 TO A PLURALITY OF CLUSTERS |
| | (GF) PAST COMMUNICATION FAILURE GROUP<br>e.g.,<br>(GF1) FIRST GROUP<br>(GF2) SECOND GROUP | ACQUIRE INFORMATION FROM CONTROL SERVER | (RF1) ALLOCATE FIRST GROUP GF1 TO A PLURALITY OF CLUSTERS<br>(RF2) ALLOCATE DIFFERENT CLUSTER TO EACH GROUP |
| CONNECTION SOURCE INFORMATION | (GG) CONNECTION SOURCE<br>e.g.,<br>(GG1) FIRST REGION<br>(GG2) SECOND REGION<br>(GG3) THIRD REGION | ACQUIRE INFORMATION FROM COMMUNICATION APPARATUS OR CONTROL SERVER | (RG1) ALLOCATE DIFFERENT CLUSTER TO EACH REGION |

FIG. 15

| INFORMATION TYPE | ITEM | ACQUISITION METHOD | RULE FOR DETERMINING LABEL INFORMATION TO BE ASSIGNED TO CLUSTER |
|---|---|---|---|
| USER INFORMATION | (GH) USER<br>e.g.,<br>(GH1) FIRST USER<br>(GH2) SECOND USER<br>⋮ | ACQUIRE INFORMATION FROM CONTROL SERVER | (RH1) ALLOCATE ONE CLUSTER TO EACH USER<br>(RH2) ALLOCATE A PLURALITY OF CLUSTERS TO EACH USER AND ROUND ROBIN |
| | (GI) USE FREQUENCY F3 FOR EACH USER<br>e.g.,<br>(GI1) F3 ≥ F3th<br>(GI2) F3 < F3th | ACQUIRE INFORMATION FROM SERVICE SERVER | (RI1) ALLOCATE FIRST GROUP GI1 TO PARTICULAR CLUSTER |
| APPARATUS SPECIFICATION INFORMATION | (GJ) PRODUCT MODEL<br>e.g.,<br>(GJ1) FIRST MODEL<br>(GJ2) SECOND MODEL<br>⋮ | ACQUIRE INFORMATION FROM COMMUNICATION APPARATUS | (RJ1) ALLOCATE CLUSTER TO EACH MODEL |
| | (GK) FIRMWARE VERSION<br>e.g.,<br>(GK1) Ver. 1<br>(GK2) Ver. 2<br>⋮ | ACQUIRE INFORMATION FROM COMMUNICATION APPARATUS | (RK1) ALLOCATE CLUSTER TO EACH VERSION |

OUTPUTTING INFORMATION TO COMMUNICATION APPARATUS

REFERENCE TO RELATED APPLICATIONS

This application claims priority from Japanese Patent Application No. 2023-140578 filed on Aug. 30, 2023. The entire content of the priority application is incorporated herein by reference.

BACKGROUND ART

Conventionally, a server is used for always-on connection of a network.

SUMMARY

A server system for always-on connection includes a plurality of always-on connection processing units and a controller. Each of the plurality of always-on connection processing units includes a plurality of always-on connection execution units. The controller receives a first request for always-on connection from a terminal apparatus. In response to the first request, the controller determines a target always-on connection processing unit that is one always-on connection processing unit to establish an always-on connection with the terminal apparatus, among the plurality of always-on connection processing units. After the target always-on connection processing unit is determined, the controller transmits, to the terminal apparatus, destination data indicating a destination of a second request for always-on connection and indicating the target always-on connection processing unit. In response to the second request from the terminal apparatus, the target always-on connection processing unit establishes an always-on connection between the terminal apparatus and one of the plurality of always-on connection execution units included in the target always-on connection processing unit.

A communication apparatus and a connection server may establish an always-on connection. After the establishment of the always-on connection, a state of the communication apparatus may change. Due to changes in the state of the communication apparatus, the appropriate connection server may change. However, there is room for improvement in the connection between the communication apparatus and the connection server related to the updated state of the communication apparatus after establishment of an always-on connection.

This specification discloses a technique for facilitating a connection between a communication apparatus and a connection server related to an updated state of the communication apparatus after establishment of an always-on connection.

According to one aspect, this specification discloses a processing server. The processing server includes a communication interface and a controller. The communication interface is configured to connect to a network. The controller is configured to perform determining apparatus state information indicating a state of a communication apparatus connected to the network. Thus, the processing server determines the apparatus state information. The controller is configured to perform determining a target connection server from among a plurality of connection servers by using the apparatus state information and a plurality of server state information. The target connection server is a connection server for an always-on connection with the communication apparatus. The plurality of server state information indicate states of respective ones of the plurality of connection servers. The plurality of server state information are associated with respective ones of the plurality of connection servers. Thus, the processing server determines the target connection server. The controller is configured to perform outputting, to the communication apparatus, connection information for connection with the target connection server. Thus, the processing server outputs the connection information to the communication apparatus. The controller is configured to perform acquiring update information indicating an update of the state of the communication apparatus, without receiving an instruction from the communication apparatus. Thus, the processing server acquires the update information. The controller is configured to perform, in response to acquiring the update information after establishment of the always-on connection between the communication apparatus and the target connection server, determining updated apparatus state information by using the update information. Thus, the processing server determines the updated apparatus state information. The controller is configured to perform, in a case where a particular condition is satisfied, determining an updated target connection server from among the plurality of connection servers by using the updated apparatus state information and the plurality of server state information, the updated target connection server being a connection server associated with related server state information, the related server state information being one of the plurality of server state information related to the updated apparatus state information; and outputting, to the communication apparatus, updated connection information for connection with the updated target connection server. Thus, the processing server determines the updated target connection server and outputs the updated connection information to the communication apparatus.

This configuration facilitates the connection between the communication apparatus and the connection server associated with the server state information related to the updated apparatus state information after the establishment of the always-on connection.

The technology disclosed in the present specification may be realized in various aspects, and may be realized in forms such as a method of determining a connection server, a processing server that determines a connection server, a method of establishing an always-on connection, a server system for establishing an always-on connection, a computer program for realizing the functions of these methods or apparatuses, and a storage medium (for example, a non-transitory computer readable storage medium) that records the computer program.

BRIEF DESCRIPTION OF DRAWINGS

FIG. 2 is a schematic diagram showing an example of cluster label data 301.

FIG. 7 is a schematic diagram showing an example of cluster apparatus data 302.

FIG. 11 is a schematic diagram showing another example of monitoring frequency data.

FIGS. 12A, 12B, and 12C are sequence diagrams showing examples of an update process.

FIG. 13 is a schematic diagram showing items included in label information and methods of acquiring information for determining the items.

FIG. 14 is a schematic diagram showing items included in label information and methods of acquiring information for determining the items.

FIG. 15 is a schematic diagram showing items included in label information and methods of acquiring information for determining the items.

DESCRIPTION

A. First Embodiment

Figure 1:
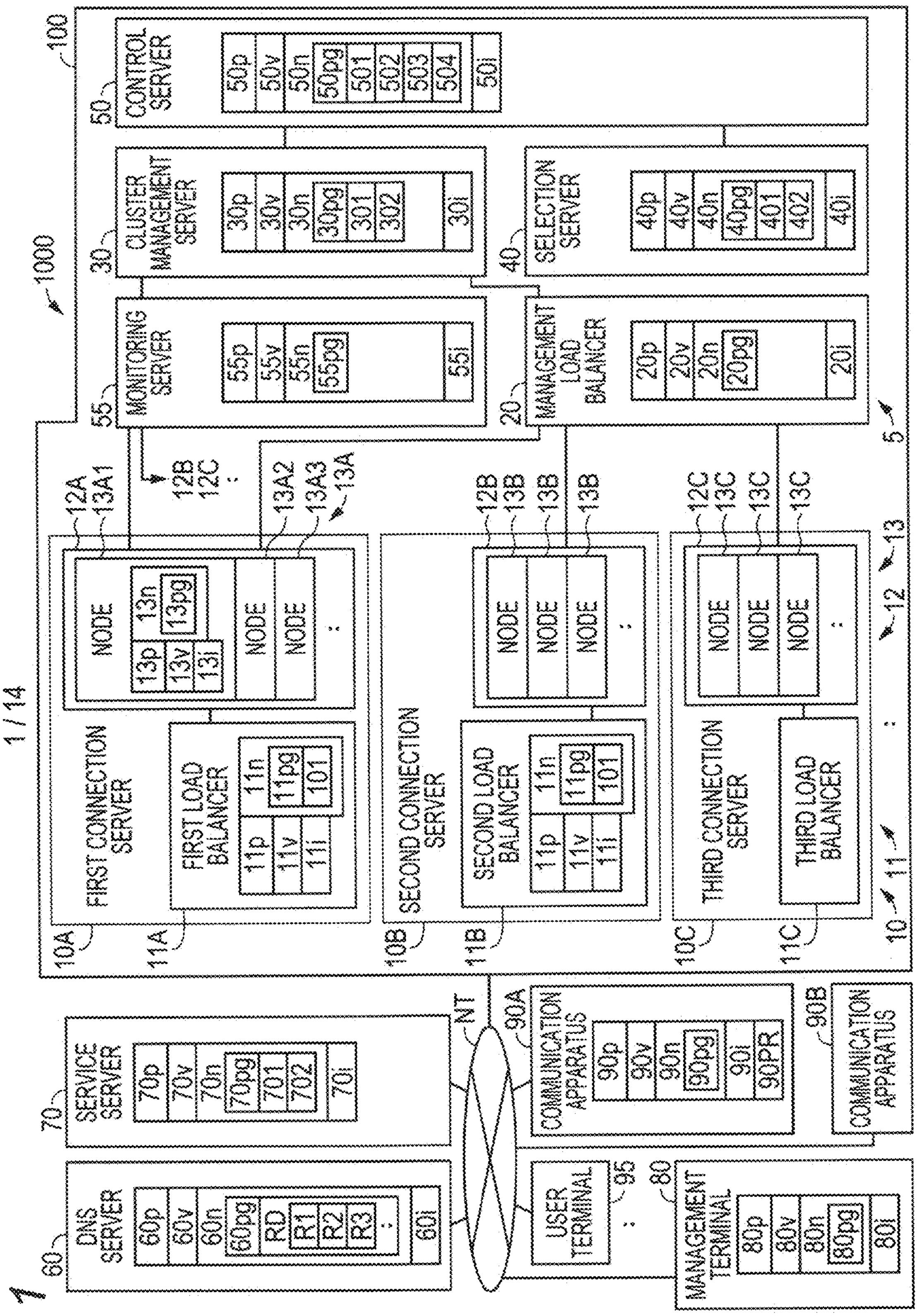
FIG. 1 is a schematic diagram showing a server system.

A1. Configuration of System:

FIG. 1 is a schematic diagram showing an embodiment of a server system. A system 1000 includes a DNS server 60, a service server 70, a management terminal 80, a plurality of communication apparatuses 90A and 90B, a user terminal 95, and a server system 100. These apparatuses 60, 70, 80, 90A, 90B, 95, and 100 are connected to a network NT. The network NT may include the so-called Internet. The network NT may include a so-called local network.

In the present embodiment, the first communication apparatus 90A is a printing apparatus (printer) having a print execution unit (print engine) 90PR. Although not shown, the hardware configuration of the second communication apparatus 90B is the same as the hardware configuration of the first communication apparatus 90A. The service server 70 provides various services for using a plurality of communication apparatuses including the communication apparatuses 90A and 90B via the network NT. For example, the service server 70 causes the first communication apparatus 90A to print an image, in response to a request from the user terminal 95 (this service is also referred to as remote print). The server system 100 performs various processes for always-on connection between the service server 70 and the plurality of communication apparatuses 90A and 90B.

The server system 100 includes a plurality of connection servers 10A, 10B, and 10C, a management load balancer 20, a cluster management server 30, a selection server 40, a control server 50, and a monitoring server 55. Each of the connection servers 10A, 10B, and 10C establishes an always-on connection with a communication apparatus (for example, the first communication apparatus 90A). As will be described below, the connection servers 10A, 10B, and 10C include node clusters 12A, 12B, and 12C, respectively, including a plurality of nodes configured to establish an always-on connection. The cluster management server 30 performs a process of allocating a node cluster to a communication apparatus. The management load balancer 20 distributes communication between the cluster management server 30 and the node clusters to the node cluster of the communication target, thereby distributing the communication load to the plurality of node clusters. The selection server 40 selects apparatus label information to be assigned to the communication apparatus. As will be described later, label information is assigned to each of the node cluster 12A, 12B, and 12C in advance. A node cluster having label information suitable for the apparatus label information of the communication apparatus is allocated to the communication apparatus. The monitoring server 55 monitors an operation of each of the plurality of connection servers (for example, the connection servers 10A, 10B, and 10C). The control server 50 controls the server system 100.

The first connection server 10A include a first load balancer 11A and a node cluster 12A. The node cluster 12A includes a plurality of nodes (including nodes 13A1, 13A2, and 13A3). The plurality of nodes have the same hardware configuration. Hereinafter, when it is not necessary to distinguish the individual nodes of the first node cluster 12A, each node is also referred to as a node 13A.

In this embodiment, the node 13A establishes an always-on connection with a communication apparatus (for example, the first communication apparatus 90A). Various methods may be employed as a method for establishing the always-on connection. In the present embodiment, the node 13A establishes a communication session for an always-on connection in accordance with XMPP (Extensible Messaging and Presence Protocol). The service server 70 communicates with the communication apparatus using the node 13A. The first load balancer 11A distributes always-on connections with the plurality of communication apparatuses to the plurality of nodes 13A, thereby distributing the load of the always-on connections to the plurality of nodes 13A.

The other connection servers 10B and 10C also have load balancers 11B and 11C and node clusters 12B and 12C, respectively. The hardware configuration of each of the load balancers 11B and 11C is the same as the hardware configuration of the first load balancer 11A. The second node cluster 12B includes a plurality of nodes 13B, and the third node cluster 12C includes a plurality of nodes 13C. The hardware configuration of the nodes 13B and 13C is the same as the hardware configuration of the node 13A. The server system 100 may include three or more connection servers. Hereinafter, when it is not necessary to distinguish the individual connection servers, each connection server is also referred to as a connection server 10. The load balancer and the node cluster of the connection server 10 are also referred to as a load balancer 11 and a node cluster 12. The nodes included in the node cluster 12 are also referred to as nodes 13. The total number of the nodes 13 included in one node cluster 12 may be different among the plurality of node clusters 12.

In this embodiment, each of the apparatuses 11, 13, 20, 30, 40, 50, 55, 60, 70, 80, and 90A includes a computer. Specifically, the apparatuses 11, 13, 20, 30, 40, 50, 55, 60, 70, 80, 90A respectively include processors (controllers) 11*p*, 13*p*, 20*p*, 30*p*, 40*p*, 50*p*, 55*p*, 60*p*, 70*p*, 80*p*, 90*p* (for example, Central Processing Unit (CPU) or System on a chip (SoC)), volatile memories 11*v*, 13*v*, 20*v*, 30*v*, 40*v*, 50*v*, 55*v*, 60*v*, 70*v*, 80*v*, 90*v* (for example, DRAM), non-volatile memories 11*n*, 13*n*, 20*n*, 30*n*, 40*n*, 50*n*, 55*n*, 60*n*, 70*n*, 80*n*, 90*n* (for example, flash memory), and communication interfaces 11*i*, 13*i*, 20*i*, 30*i*, 40*i*, 50*i*, 55*i*, 60*i*, 70*i*, 80*i*, 90*i* (for example, wired LAN interface (for example, Ethernet) and/or wireless interface (for example, IEEE802.11)). The non-volatile memories 11*n*, 13*n*, 20*n*, 30*n*, 40*n*, 50*n*, 55*n*, 60*n*, 70*n*, 80*n*, and 90*n* store programs 11*pg*, 13*pg*, 20*pg*, 30*pg*, 40*pg*, 50*pg*, 55*pg*, 60*pg*, 70*pg*, 80*pg*, and 90*pg* for operating corresponding apparatuses 11, 13, 20, 30, 40, 50, 55, 60, 70, 80, and 90A, respectively, in advance. The processors 11*p*, 13*p*, 20*p*, 30*p*, 40*p*, 50*p*, 55*p*, 60*p*, 70*p*, 80*p*, and 90*p* perform various processes described later in accordance with the programs 11*pg*, 13*pg*, 20*pg*, 30*pg*, 40*pg*, 50*pg*, 55*pg*, 60*pg*, 70*pg*, 80*pg*, and 90*pg*, respectively. The program of the communication apparatus (for example, the program 90*pg* of the first communication apparatus 90A) is an example of firmware.

The non-volatile memory of the load balancer 11 of the connection server 10 (for example, the non-volatile memory 11*n* of the load balancer 11A of the first connection server 10A) stores allocation data 101 indicating correspondence between communication apparatuses and nodes. The non-volatile memory 30*n* of the cluster management server 30 stores cluster label data 301 and cluster apparatus data 302. The non-volatile memory 40*n* of the selection server 40 stores apparatus label configuration data 401 and monitoring frequency data 402. The non-volatile memory 50*n* of the control server 50 stores API history data 501, always-on connection history data 502, user correspondence data 503, and service history data 504. The user correspondence data 503 indicates correspondence among an identifier of a user who uses a service, an identifier of a communication apparatus used for the service, a model name of the communication apparatus, an identifier of the service, and apparatus label information (described later). As will be described later, when the user starts using a new service, the identifier of the service is registered in the user correspondence data 503. When the user ends using the service, the identifier of the service is deleted from the user correspondence data 503. The other data 101, 301, 302, 401, 402, 501, 502, and 504 will be described in detail later.

The non-volatile memory 70*n* of the service server 70 stores service correspondence data 701 and history data 702. The service correspondence data 701 indicates correspondence among an identifier of a user who uses a service, an identifier of a communication apparatus used for the service, and an identifier of the service. As will be described later, when the user starts using a new service, the identifier of the service is registered in the service correspondence data 701. When the user ends using the service, the identifier of the service is deleted from the service correspondence data 701. The history data 702 indicates a use history of the service.

The DNS server 60 performs name resolution on the network NT. The non-volatile memory 60*n* of the DNS server 60 stores record data RD indicating correspondence between IP addresses and domain names. The record data RD indicates a plurality of correspondences including correspondences R1, R2 and R3. These correspondences R1, R2 and R3 indicate the load balancers 11A, 11B and 11C, respectively. Although not shown, the record data RD also indicates correspondences of the control server 50 and the service server 70.

The user terminal 95 is a terminal apparatus operated by a user, such as a smartphone, a tablet computer, or a personal computer. The user causes the service server 70 to perform various processes by operating the user terminal 95. The management terminal 80 is a terminal apparatus operated by an administrator of the server system 100, such as a smartphone, a tablet computer, or a personal computer. The administrator performs various settings of the server system 100 by accessing the server system 100 via the management terminal 80. For example, the administrator edits control data such as data 301, 401, and 402.

FIG. 2 is a schematic diagram showing an example of the cluster label data 301. The cluster label data 301 indicates correspondence between cluster identifiers and server label information SI. The cluster identifier is the identifier of the node cluster 12 (and the connection server 10 having the node cluster 12). The cluster identifier of each of the plurality of node clusters 12 is determined in advance. In FIG. 2, the cluster label data 301 indicates correspondence of each of a plurality of cluster identifiers including eight cluster identifiers C1 to C8. In the present embodiment, the server label information SI indicates a combination of three items, that is, a region item GG, a model item GJ, and a monitoring frequency item GL. The region item GG indicates a region where the communication apparatus is used (for example, a product destination, a country, and so on of the communication apparatus). In FIG. 2, the region item GG is selected from a plurality of regions including a first region GG1 and a second region GG2. The model item GJ indicates a model of a communication apparatus. In FIG. 2, the model item GJ is selected from a plurality of models including a first model GJ1 and a second model GJ2.

The monitoring frequency item GL indicates the frequency of monitoring of the node cluster 12 by the monitoring server 55. The monitoring server 55 monitors the operation of each of the plurality of connection servers 10. In the present embodiment, the processor 55*p* of the monitoring server 55 periodically transmits a response request to each node 13 of each connection server 10. The node 13 transmits a response to the monitoring server 55 in response to the response request. The node 13 having a malfunction does not transmit a response. In response to receiving a response within a particular waiting time from the transmission of the response request, the processor 55*p* classifies the node 13 that has transmitted the response as a normal node 13. In response to not receiving a response within the particular waiting time from the transmission of the response request, the processor 55*p* classifies the node 13 which is the destination of the response request as an abnormal node 13. In response to detecting the abnormal node 13, the processor 55*p* performs processing for resolving the malfunction of the node 13 (for example, notification to an administrator). The monitoring frequency item GL in FIG. 2 indicates the frequency of monitoring (in the present embodiment, the frequency of transmission of response requests). In the present embodiment, the monitoring frequency item GL is selected from a plurality of monitoring frequencies including a low frequency GLL and a high frequency GLH higher than the low frequency GLL. The low frequency GLL and the high frequency GLH may be various frequencies (for example, once every hour, once every six hours, once every twelve hours, once every day, once every two days, and so on).

As described above, in the present embodiment, the server label information SI is assigned in advance to the node clusters 12 (and the connection servers 10) such that the load is distributed among the plurality of node clusters 12 in accordance with the combination of the region item GG, the model item GJ, and the monitoring frequency item GL.

Figure 3:
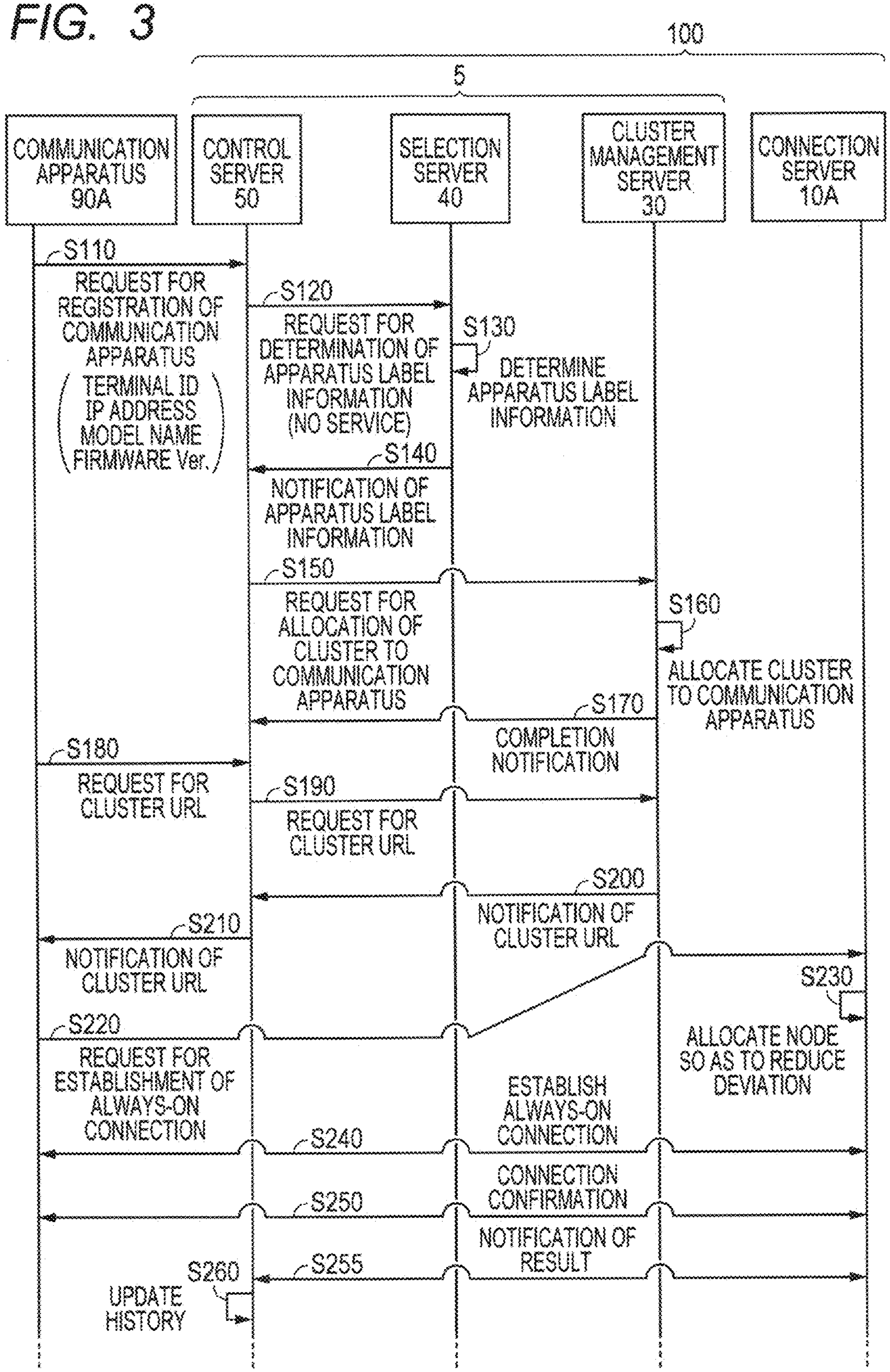
FIG. 3 is a sequence diagram showing an example of an always-on connection establishment process.

A2. Always-on Connection:

FIG. 3 is a sequence diagram showing an example of an always-on connection establishment process. FIG. 3 shows an example of a process in a case where the first communication apparatus 90A establishes an always-on connection with the server system 100. In response to a power state of the first communication apparatus 90A being switched from an OFF state to an ON state, the processor 90*p* of the first communication apparatus 90A starts the process for always-on connection establishment. For example, when the user turns on the power of the first communication apparatus 90A for the first time, the initial connection server 10 for always-on connection is determined by the processing of FIG. 3, and an always-on connection between the first communication apparatus 90A and the initial connection server 10 is established. In a case where the always-on connection is disconnected due to a communication error and so on, the processor 90*p* starts the process for always-on connection establishment.

In S110, the processor 90*p* transmits a request for registration (registration request) of the communication apparatus to the control server 50. The registration request includes terminal information data of terminal information related to the communication apparatus 90A. The terminal information may include any information related to the communication apparatus 90A (for example, an identifier, an IP address, a model name, a firmware version, and so on, of the communication apparatus 90A). In the present embodiment, the terminal information includes the identifier and the model name of the communication apparatus 90A. In the present embodiment, the non-volatile memory 90*n* stores in advance data indicating the terminal information (not shown). The processor 90*p* acquires the terminal information by referring to this data.

In S120, the processor 50*p* of the control server 50 transmits, to the selection server 40, a request for determination (determination request) of the apparatus label information which is the label information to be assigned to the communication apparatus 90A. The determination request includes the terminal information data received in S110. The processor 50*p* acquires the identifier of the service associated with the identifier of the communication apparatus 90A by referring to the user correspondence data 503 (FIG. 1). The total number of services associated with the identifier of the communication apparatus may be zero (for example, in a case where the always-on connection establishment process is performed for the first time for the communication apparatus). In a case where the total number of services associated with the identifier of the communication apparatus is one or more, the determination request further includes data of the identifier of the service associated with the identifier of the communication apparatus.

Figures 4, 5:
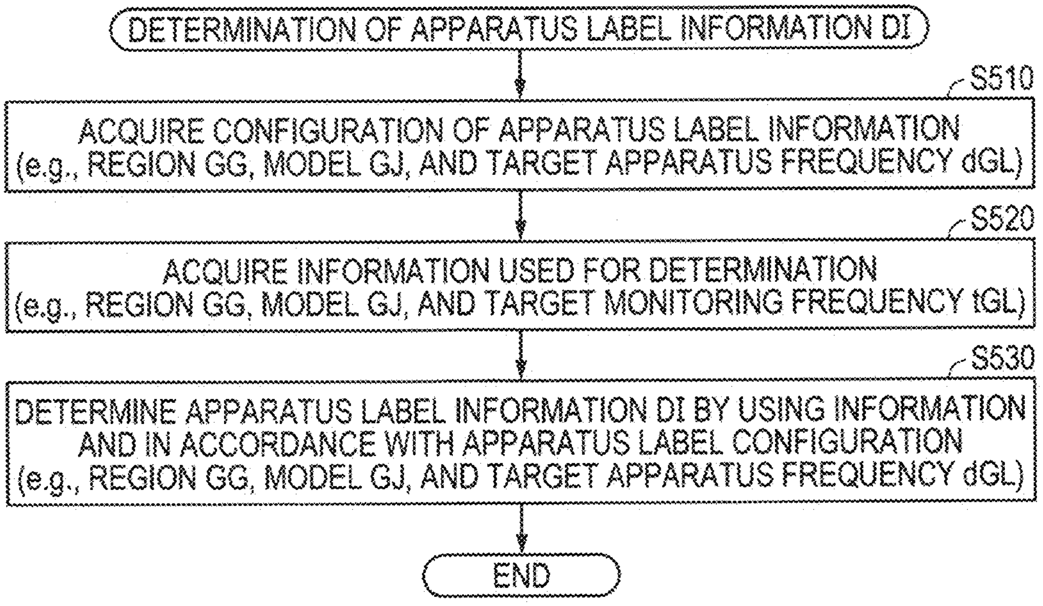
FIG. 4 is a flowchart showing an example of a process for determining apparatus label information DI.
FIG. 5 is a schematic diagram showing an example of monitoring frequency data 402.

In S130, the processor 40*p* of the selection server 40 determines the apparatus label information. FIG. 4 is a flowchart showing an example of a process of determining the apparatus label information DI. In S510, the processor 40*p* of the selection server 40 acquires an assignment label configuration which is the configuration of the apparatus label information DI by referring to the apparatus label configuration data 401 (FIG. 1). As shown in FIG. 2, in the present embodiment, the server label information SI indicates a combination of three items, that is, the region item GG, the model item GJ, and the monitoring frequency item GL. In the present embodiment, the apparatus label configuration data 401 indicates that a combination of the region item GG, the model item GJ, and a target apparatus frequency dGL should be determined as the apparatus label information DI. The target apparatus frequency dGL is a target of the monitoring frequency item GL.

In S520, the processor 40*p* acquires information used for determining the apparatus label information DI. In the present embodiment, the processor 40*p* acquires the identifier and the model name of the communication apparatus, by referring to the terminal information data included in the determination request received in S120 (FIG. 3). The processor 40*p* acquires the target monitoring frequency by referring to the monitoring frequency data 402 (FIG. 1). FIG. 5 is a schematic diagram showing an example of the monitoring frequency data 402. In the present embodiment, the monitoring frequency data 402 indicates a correspondence between a service item GA and the target monitoring frequency tGL. The service item GA indicates a service for using the communication apparatus. The target monitoring frequency tGL is a target value of the monitoring frequency item GL (FIG. 2). In the present embodiment, the target monitoring frequency tGL is determined in advance for each service. The low frequency GLL is associated with a service for which the importance of the availability of communication via the connection server 10 is relatively low, such as no service or information acquisition. The high frequency GLH is associated with a service in which the importance of the availability of communication via the connection server 10 is relatively high, such as remote print and remote scan. The processor 40*p* refers to the target monitoring frequency tGL associated with each of the identifiers of the services included in the determination request, and adopts the highest target monitoring frequency tGL as the target monitoring frequency tGL for determining the apparatus label information DI. In a case where the determination request does not include an identifier of a service, the processor 40*p* adopts the low frequency GLL associated with "none". In S530 (FIG. 4), the processor 40*p* determines the apparatus label information DI according to the assignment label configuration by using the information acquired in S520. In the present embodiment, the processor 40*p* determines the region item GG of the apparatus label information DI by using the identifier of the communication apparatus 90A. The correspondence between the identifier of the communication apparatus and the region item GG is determined in advance. For example, the region item GG is determined to be the first region GG1. The processor 40*p* determines the model item GJ of the apparatus label information DI by using the model name of the communication apparatus 90A. For example, the model item GJ is determined to be the first model GJ1. The processor 40*p* also determines the target apparatus frequency dGL by using the target monitoring frequency tGL acquired in S520. The target apparatus frequency dGL may be determined to be various frequencies higher than or equal to the target monitoring frequency tGL adopted in S520. In the present embodiment, the target apparatus frequency dGL of the apparatus label information DI is set to the same frequency as the target monitoring frequency tGL adopted in S520. For example, in a case where the determination request does not include data of an identifier of a service, the target apparatus frequency dGL is determined to be the low frequency GLL which is associated with "none". Then, the processor 40*p* ends the processing of FIG. 4, that is, S130 of FIG. 3.

For a specific type of communication apparatus, instead of allocating a specific node cluster 12, the node cluster 12 to be allocated may be distributed to a plurality of node clusters 12. For example, in a case where the number of shipments of a specific type of communication apparatus corresponding to a specific product destination or a specific model name is small, the node cluster 12 to be allocated to the specific type of communication apparatus may be distributed to a plurality of node clusters 12. In the present embodiment, in a case where the communication apparatus is a communication apparatus of a specific type, the processor 40*p* does not determine specific apparatus label information DI, but determines empty apparatus label information DI.

In S140 (FIG. 3), the processor 40*p* of the selection server 40 transmits the determined apparatus label information DI to the control server 50. The processor 50*p* of the control server 50 registers (stores) correspondence among the apparatus label information DI, and the identifier of the communication apparatus and the model name of the communication apparatus acquired in S110, in the user correspondence data 503.

In S150, the processor 50*p* of the control server 50 transmits, to the cluster management server 30, a request for allocation (allocation request) for allocating the node cluster 12 to the communication apparatus 90A. The allocation request includes data indicating the apparatus label information DI acquired in S140 and information (identifier, IP addresses, and so on) related to the communication apparatus 90A.

Figure 6:
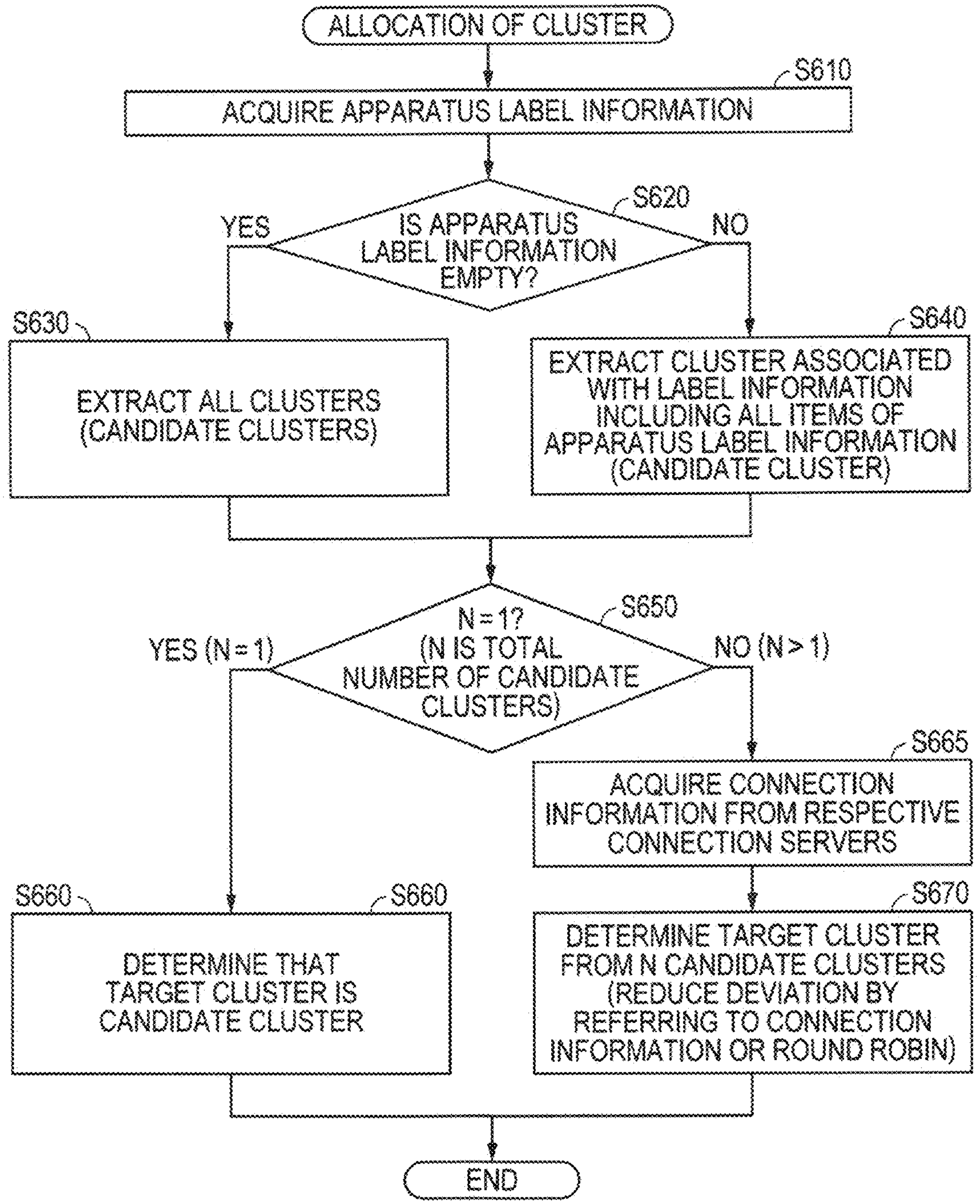
FIG. 6 is a flowchart showing an example of a node cluster allocation process.

In S160, the processor 30*p* of the cluster management server 30 allocates the node cluster 12 to the communication apparatus 90A. The allocated node cluster 12 is one node cluster 12 that should establish an always-on connection with the communication apparatus 90A. FIG. 6 is a flowchart showing an example of a process of allocating a node cluster. In S610, the processor 30*p* acquires the apparatus label information DI (S150 (FIG. 3)).

In S620, the processor 30*p* determines whether the apparatus label information DI is empty. In response to determining that the apparatus label information DI is empty (S620: Yes), in S630, the processor 30*p* extracts all the node clusters as candidate clusters, and proceeds to S650.

In response to determining that the apparatus label information DI is not empty (S620: No), in S640, the processor 30*p* refers to the cluster label data 301 (FIG. 2) and extracts a node cluster suitable for the apparatus label information DI as the candidate cluster. In the present embodiment, the processor 30*p* extracts the node cluster to which the apparatus label information DI is assigned as the candidate cluster. For example, the processor 30*p* extracts, as the candidate cluster, a node cluster associated with the server label information SI including the respective options of all the items of the apparatus label information DI. For example, in a case where the region item GG of the apparatus label information DI is the first region GG1, the model item GJ is the first model GJ1, and the target apparatus frequency dGL is the low frequency GLL, the processor 30*p* extracts the first cluster identifier C1 associated with the server label information SI including the first region GG1, the first model GJ1, and the low frequency GLL. Hereinafter, it is assumed that the first cluster identifier C1 indicates the first node cluster 12A (that is, the first connection server 10A). After S640, the processor 30*p* proceeds to S650.

In S650, the processor 30*p* determines whether the total number N of candidate clusters is 1. If N=1 (S650: Yes), in S660, the processor 30*p* determines that the candidate cluster is a target node cluster (also simply referred to as a target cluster) that is the node cluster to be allocated to the communication apparatus. The processor 30*p* adds data indicating the correspondence between the identifier of the target cluster and the identifier of the communication apparatus, to the cluster apparatus data 302 (FIG. 1).

FIG. 7 is a schematic diagram showing an example of the cluster apparatus data 302. The cluster apparatus data 302 indicates correspondence between a cluster identifier and a communication apparatus identifier. In FIG. 7, the cluster apparatus data 302 shows the correspondence of each of a plurality of cluster identifiers including four cluster identifiers C1 to C4. Each of the plurality of communication apparatus identifiers including eight communication apparatus identifiers T1 to T8 is associated with one of the cluster identifiers. In S660 (FIG. 6), the processor 30*p* adds the communication apparatus identifier (for example, the identifier of the communication apparatus 90A) indicated by the request of S150 (FIG. 3) to the communication apparatus identifier associated with the cluster identifier of the target cluster. Then, the processor 30*p* ends the processing of FIG. 6, that is, S160 (FIG. 3).

In a case where the total number N of candidate clusters is different from 1 (FIG. 6, S650: No), N>1 in the present embodiment. In this case, in S665, the processor 30*p* acquires connection information from each of the N connection servers 10 (FIG. 1) corresponding to the N candidate clusters. Communication between the cluster management server 30 and the connection server 10 is relayed by the management load balancer 20. The connection information is information indicating a connection state of the connection server 10, and indicates the number of always-on connections in the present embodiment. The number of always-on connections is the number of already-established always-on connections with the connection server 10. The processor 30*p* acquires the connection information from the load balancer 11 of each connection server 10.

In S670, the processor 30*p* selects one target cluster (that is, one connection server 10) so as to reduce the deviation of the number of always-on connections among the N candidate clusters. For example, the processor 30*p* selects, as the target cluster, the node cluster 12 having the smallest number of always-on connections from among the N candidate clusters. The processor 30*p* adds data indicating the correspondence between the identifier of the target cluster and the identifier of the communication apparatus to the cluster apparatus data 302 (FIG. 7), similarly to S660. Then, the processor 30*p* ends the processing of FIG. 6, that is, S160 (FIG. 3).

Here, it is assumed that the first node cluster 12A of the first connection server 10A is allocated to the first communication apparatus 90A. Hereinafter, the allocated node cluster is also referred to as a target node cluster. The connection server having the target node cluster is also referred to as a target connection server.

In S170 (FIG. 3), the processor 30*p* of the cluster management server 30 transmits a completion notification of allocation of the node cluster to the control server 50.

After S110, in S180 the processor 90*p* of the first communication apparatus 90A transmits a request for a destination for accessing the node cluster to the control server 50. The request includes data indicating the identifier of the communication apparatus 90A. In the present embodiment, a URL (Uniform Resource Locator) is used as the destination. Hereinafter, the destination is also referred to as a cluster URL. The execution timing of S180 may be performed at various timings. For example, the processor 90*p* may perform S180 after a particular time elapses after S110. Alternatively, the processor 50*p* of the control server 50 may transmit a completion notification of allocation of the node cluster to the first communication apparatus 90A in response to the completion notification of S170. Then, the processor 90*p* of the first communication apparatus 90A may perform S180 in response to the completion notification.

In S190, the processor 50*p* of the control server 50 transmits a request for a cluster URL to the cluster management server 30 in response to the request of S180. The request includes data indicating the identifier of the communication apparatus 90A.

In S200, the processor 30*p* of the cluster management server 30 searches for a cluster identifier associated with the identifier of the communication apparatus 90A by referring to the cluster apparatus data 302 (FIG. 7). The processor 30*p* transmits, to the control server 50, the cluster URL associated with the found cluster identifier. In the present embodiment, the cluster identifier is associated in advance with the URL of the load balancer 11 of the connection server 10 associated with the cluster identifier. For example, in a case where the cluster identifier indicates the first connection server 10A (FIG. 1), the cluster identifier is associated with the URL of the first load balancer 11A.

In S210, the processor 50*p* of the control server 50 transmits the cluster URL to the communication apparatus 90A.

In S220, the processor 90*p* of the communication apparatus 90A transmits an always-on connection establishment request to the apparatus indicated by the cluster URL. The IP address of the destination apparatus (here, the first load balancer 11A) is provided by the DNS server 60 (FIG. 1). The always-on connection establishment request includes data indicating information related to the communication apparatus 90A (including the IP address and the identifier of the communication apparatus).

In S230, the processor 11*p* of the first load balancer 11A of the first connection server 10A selects one node 13A to be allocated to the transmission source (here, the communication apparatus 90A) of the always-on connection establishment request, from among the plurality of nodes 13A of the first node cluster 12A. One node 13A is selected so as to reduce the deviation of the load or the deviation of the number of always-on connections among the plurality of nodes 13A of the first node cluster 12A. In the present embodiment, one node 13A is selected so as to reduce the deviation of the number of always-on connections. Hereinafter, the selected node 13A is also referred to as a target node 13A. The processor 11*p* of the load balancer 11A adds, to the allocation data 101 (FIG. 1), data indicating the correspondence between information related to the communication apparatus (including the identifier and the IP address of the communication apparatus in the present embodiment) and the target node.

In S240, the processor 11*p* of the first load balancer 11A of the first connection server 10A supplies the always-on connection establishment request from the communication apparatus 90A to the target node 13A of the first connection server 10A. The processor 13*p* of the target node 13A communicates with the communication apparatus 90A in response to the always-on connection establishment request, thereby performing processing for establishing an always-on connection. In this way, the always-on connection between the communication apparatus 90A and the target node 13A is established. Then, the processing for establishing the always-on connection ends.

After the establishment of the always-on connection, the target node 13A and the communication apparatus 90A perform so-called KeepAlive communication to maintain the always-on connection (S250). For example, the processor 13*p* of the target node 13A transmits KeepAlive data addressed to the communication apparatus 90A in accordance with a predetermined schedule (for example, at predetermined time intervals). The processor 90*p* of the communication apparatus 90A transmits data indicating a response addressed to the target node 13A in response to reception of the KeepAlive data. Thus, the communication session between the target node 13A and the communication apparatus 90A is maintained. Instead of the target node 13A, the processor 90*p* of the communication apparatus 90A may transmit the KeepAlive data addressed to the target node 13A in accordance with a predetermined schedule.

In the present embodiment, the load balancer 11 or the node 13 of the target connection server 10A transmits result data indicating the result of connection confirmation by the KeepAlive communication to the control server 50 (S255). The result data indicates the identifier of the communication apparatus, the IP address of the communication apparatus, the date and time, and a flag indicating whether the connection confirmation has been successful. The processor 50*p* of the control server 50 adds the result data to the always-on connection history data 502 (FIG. 1) (S260). In this way, the always-on connection history data 502 is updated to indicate the history of always-on connection for each communication apparatus. S250 to S260 are performed repeatedly.

In the present embodiment, communication between the communication apparatus 90A and the target node 13A is relayed by the first load balancer 11A. Alternatively, after S230, the target node 13A and the communication apparatus 90A may directly communicate with each other without the first load balancer 11A.

Another communication apparatus (for example, the second communication apparatus 90B) also establishes an always-on connection with the connection server 10 allocated to the communication apparatus in S160 by the same processing as the processing of FIG. 3.

Figure 8:
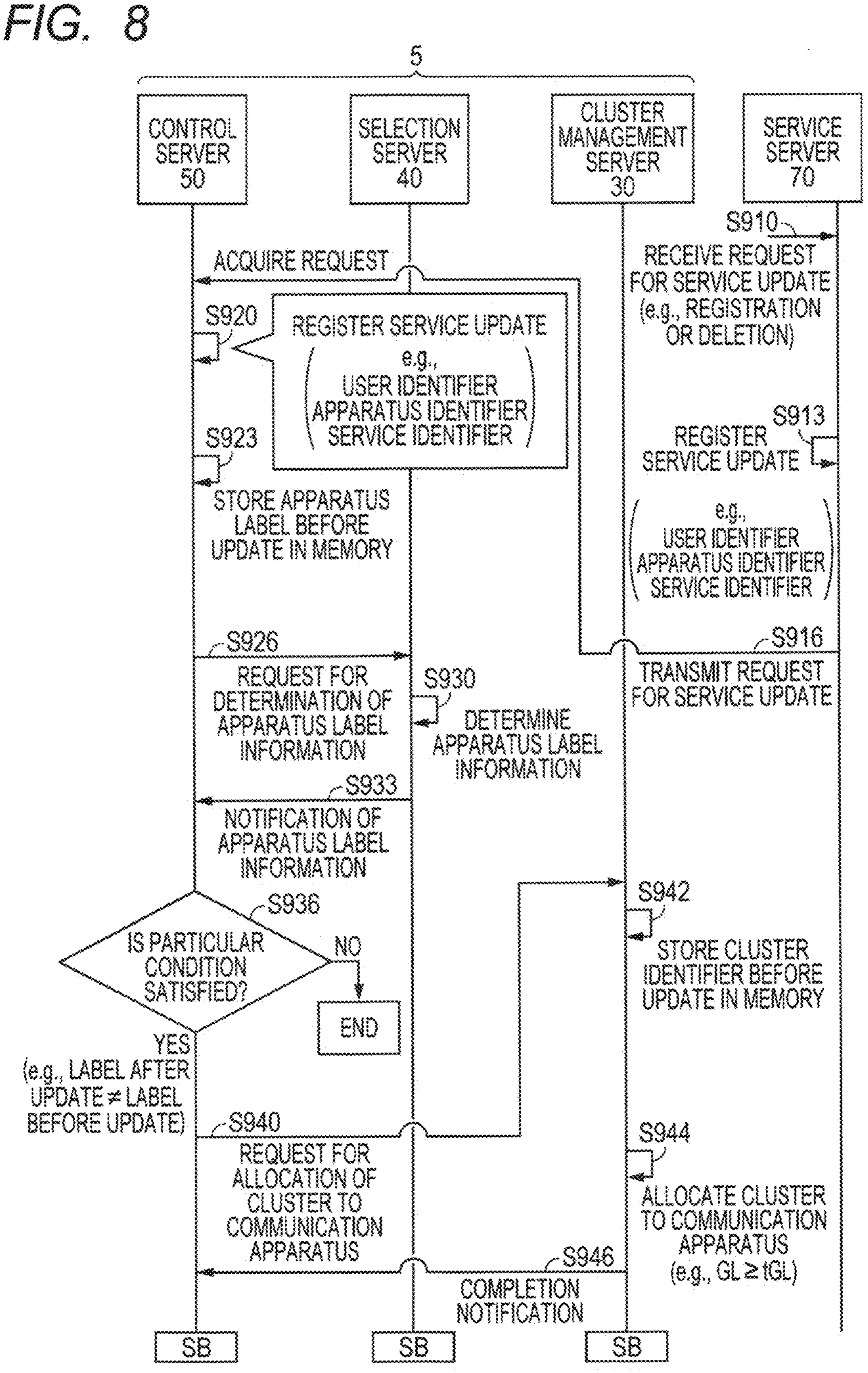
FIG. 8 is a flowchart showing an example of a connection server update process.
Figure 9:
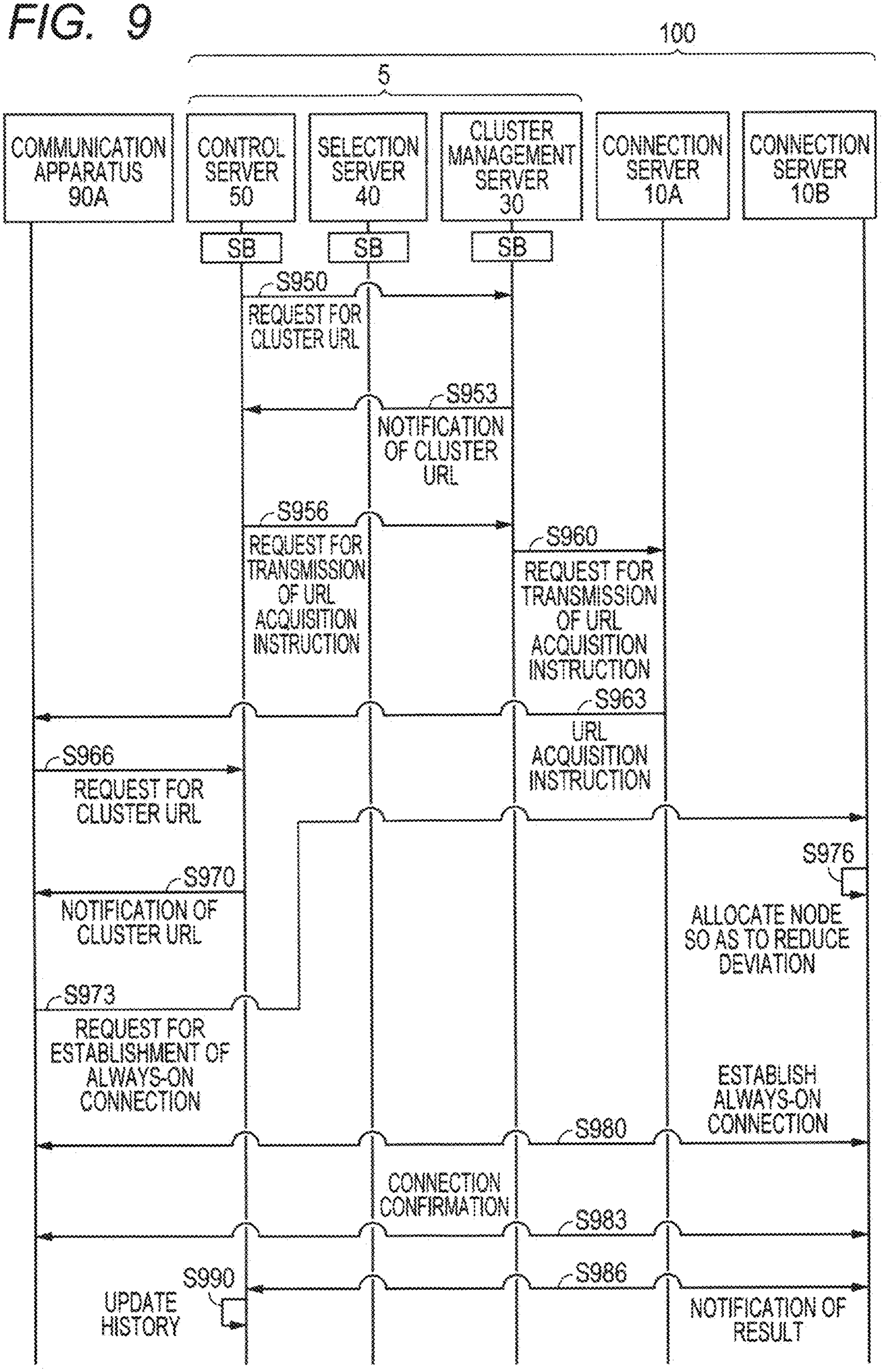
FIG. 9 is a flowchart showing an example of the connection server update process.

A3. Update of Connection Server:

FIGS. 8 and 9 are flowcharts showing an example of a connection server update process. FIG. 9 shows a continuation of FIG. 8. In the present embodiment, the connection server update process is performed when the user starts using a new service and when the user stops using a service. By the update process, the service correspondence data 701 of the service server 70 and the user correspondence data 503 of the control server 50 are updated. Then, the node 13 that establishes the always-on connection with the communication apparatus is updated.

In S910, the service server 70 acquires a request for service update (service update request) from the user. The service update request includes data indicating one or both of a start service and a stop service, and a target apparatus identifier. The start service is a service for which the start of the use is requested. The stop service is a service for which the stop of the use is requested. The target apparatus identifier is an identifier of a target apparatus that is an apparatus associated with a service. Hereinafter, it is assumed that the user starts remote print using the first communication apparatus 90A. In this case, the service update request indicates the start service indicating the remote print and the target apparatus identifier indicating the first communication apparatus 90A.

In the present embodiment, the user inputs an update request to the service server 70 by logging in to the service server 70. The update request is associated with the identifier of the logged-in user. Various methods may be used for login and input of the update request. For example, the program 70*pg* of the service server 70 may be configured to provide an Application Programming Interface (API) for login and input of the update request. The user may perform login and input of the update request through a dedicated application that operates on an external apparatus such as the user terminal 95. Alternatively, the program 70*pg* may be configured to provide a web page for login and input of the update request. The user may perform login and input of the update request through a browser operating on an external apparatus such as the user terminal 95.

In S913, the processor 70*p* of the service server 70 registers the update of the service in the service correspondence data 701. In a case where the update request indicates the start service, the processor 70*p* registers correspondence among the identifier of the user who has logged in (referred to as a target user identifier), the target apparatus identifier, and the identifier of the start service in the service correspondence data 701. In a case where the update request indicates the stop service, the processor 70*p* deletes the identifier of the stop service associated with the target user identifier and the target apparatus identifier from the service correspondence data 701.

In S916, the processor 70*p* transmits a request for service update to the control server 50. The request includes data indicating the identifier of the start service or the stop service, the target user identifier, and the target apparatus identifier.

In S920, the processor 50*p* of the control server 50 registers the update of the service in the user correspondence data 503. In a case where the request of S916 indicates the start service, the processor 50*p* registers the correspondence among the target user identifier, the target apparatus identifier, and the identifier of the start service in the user correspondence data 503. In a case where the request of S916 indicates the stop service, the processor 50*p* deletes the identifier of the stop service associated with the target user identifier and the target apparatus identifier from the user correspondence data 503.

In S923, the processor 50*p* acquires the apparatus label information DI of the target apparatus identifier by referring to the user correspondence data 503. The processor 50*p* stores data of the acquired apparatus label information DI in a memory (for example, the volatile memory 50*v* or the non-volatile memory 50*n*) as data of the apparatus label information DI before the update.

The subsequent S926, S930, and S933 are similar to S120, S130, and S140 in FIG. 3, respectively. In S926, the processor 50*p* acquires the model name and the identifier of the service associated with the target apparatus identifier, by referring to the user correspondence data 503. The processor 50*p* transmits, to the selection server 40, a determination request including data indicating the target apparatus identifier, the model name, and the service identifier. In a case where the total number of services associated with the target apparatus identifier is zero, the service identifier is omitted.

In S930, the processor 40*p* of the selection server 40 performs the processing of FIG. 4 to determine the apparatus label information DI. The determination results of the region item GG and the model item GJ are the same as the determination results in S130 in FIG. 3. The target apparatus frequency dGL is determined to be the target monitoring frequency tGL (here, the high frequency GLH) associated with the remote print by the monitoring frequency data 402 (FIG. 5).

In S933, the processor 40*p* transmits the determined apparatus label information DI to the control server 50. The processor 50*p* of the control server 50 registers the correspondence between the apparatus label information DI and the target apparatus identifier acquired in S916 in the user correspondence data 503.

In S936, the processor 50*p* determines whether a particular condition is satisfied. In a case where the particular condition is satisfied, the connection server 10 is updated. In the present embodiment, the particular condition is that the updated apparatus label information DI is different from the apparatus label information DI before the update. In the present embodiment, in a case where one or more items among the plurality of items GG, GJ, and dGL are different between before and after the update, it is determined that the updated apparatus label information DI is different from the apparatus label information DI before the update. In a case where there is no difference between the updated apparatus label information DI and the apparatus label information DI before the update, it is determined that the updated apparatus label information DI is the same as the apparatus label information DI before the update.

In a case where the particular condition is not satisfied, that is, in a case where the updated apparatus label information DI is the same as the apparatus label information DI before the update (S936: No), the control server 50 ends the update process without performing the processing for updating the connection server 10.

In a case where the particular condition is satisfied, that is, in a case where the updated apparatus label information DI includes a portion different from the apparatus label information DI before the update (S936: Yes), in S940 the processor 50*p* transmits an allocation request to the cluster management server 30. S940 is similar to S150 (FIG. 3). The allocation request includes data indicating the apparatus label information DI acquired in S933 and the target apparatus identifier.

In S942, the processor 30*p* of the cluster management server 30 acquires the cluster identifier associated with the target apparatus identifier, by referring to the cluster apparatus data 302 (FIG. 7). The processor 30*p* stores the acquired cluster identifier in a memory (for example, the volatile memory 30*v* or the non-volatile memory 30*n*) as data of the cluster identifier before the update.

S944 is similar to S160 (FIG. 3). The processor 30*p* determines the target cluster by using the apparatus label information DI acquired in S940 and the cluster label data 301 (FIG. 2). For example, in a case where the apparatus label information DI indicates the first region GG1, the first model GJ1, and the high frequency GLH, the processor 30*p* adopts the second cluster identifier C2 (FIG. 2) associated with these information GG1, GJ1, and GLH as the identifier of the target cluster. In this way, by using the updated apparatus label information DI, the processor 30*p* adopts the identifier of the target cluster (here, the second cluster identifier C2) different from the identifier of the target cluster (here, the first cluster identifier C1) before the update. Hereinafter, the second cluster identifier C2 indicates the second node cluster 12B (that is, the second connection server 10B).

In a case where the cluster identifier of the target cluster is different from the cluster identifier before the update, the processor 30*p* further updates the cluster apparatus data 302 (FIG. 7). The processor 30*p* adds the target apparatus identifier to the communication apparatus identifier associated with the identifier of the updated target cluster, and deletes the target apparatus identifier from the communication apparatus identifier associated with the cluster identifier before the update. In a case where the updated cluster identifier is the same as the cluster identifier before the update, the update of the cluster apparatus data 302 is omitted.

S946 is similar to S170 (FIG. 3). The processor 30*p* transmits a completion notification of allocation of the node cluster to the control server 50.

The subsequent S950 and S953 (FIG. 9) are similar to S190 and S200 of FIG. 3, respectively. In S950, the processor 50*p* of the control server 50 transmits a request for the cluster URL (including data of the target apparatus identifier) to the cluster management server 30. In S953, the processor 30*p* of the cluster management server 30 searches for a cluster identifier associated with the target apparatus identifier by referring to the cluster apparatus data 302 (FIG. 7). The processor 30*p* transmits the cluster URL associated with the found cluster identifier to the control server 50. The cluster URL indicates the second connection server 10B associated with the second cluster identifier C2.

In S956, the processor 50*p* of the control server 50 transmits a request for transmission (transmission request) of a URL acquisition instruction to the cluster management server 30. The transmission request includes data of the target apparatus identifier.

In S960, the processor 30*p* of the cluster management server 30 acquires the cluster identifier before the update associated with the target apparatus identifier by referring to the data stored in the memory in S942 (FIG. 8). The processor 30*p* transmits a transmission request of a URL acquisition instruction addressed to the target apparatus, to the load balancer 11 of the connection server 10 indicated by the cluster identifier before the update (here, the first load balancer 11A of the first connection server 10A) via the management load balancer 20. The transmission request includes data of the target apparatus identifier.

In S963, the processor 11*p* of the first load balancer 11A of the first connection server 10A searches for the node 13A (referred to as a communication node 13A) associated with the target apparatus identifier by referring to the allocation data 101. The processor 11*p* transmits a transmission request of the URL acquisition instruction (including data of the target apparatus identifier) to the found communication node 13A. The processor 13*p* of the communication node 13A transmits the URL acquisition instruction to the first communication apparatus 90A indicated by the target apparatus identifier.

The subsequent S966 and S970 are similar to S180 and S210 of FIG. 3, respectively. In S966, the processor 90*p* of the first communication apparatus 90A transmits a request for a cluster URL (including data indicating the identifier of the communication apparatus 90A) to the control server 50. In S970, the processor 50*p* of the control server 50 transmits, to the communication apparatus 90A, the cluster URL (here, the cluster URL acquired in S953) associated with the identifier of the communication apparatus 90A included in the request of S966.

The subsequent S973, S976, S980, S983, S986, and S990 are similar to S220, S230, S240, S250, S255, and S260 in FIG. 3. The difference between the processing of FIG. 9 and the processing of FIG. 3 is that, in the processing of FIG. 9, the second connection server 10B is used instead of the first connection server 10A (FIG. 1).

In S973, the processor 90*p* of the communication apparatus 90A transmits an always-on connection establishment request indicating information related to the communication apparatus 90A (including the IP address and the identifier of the communication apparatus) to the second load balancer 11B of the second connection server 10B indicated by the cluster URL. In S973, the processor 90*p* may restart the communication apparatus 90A before transmitting the always-on connection establishment request. Then, the processor 90*p* may transmit the always-on connection establishment request after the restart.

In S976, the processor 11*p* of the second load balancer 11B selects a target node 13B for the communication apparatus 90A from among the plurality of nodes 13B of the second node cluster 12B. The method of selecting the target node 13B is the same as the selection method in S230 (FIG. 3). The processor 11*p* of the load balancer 11B adds, to the allocation data 101 of the second load balancer 11B, data indicating the correspondence between the information related to the communication apparatus (including the identifier and the IP address of the communication apparatus in the present embodiment) and the target node 13B.

In S980, the processor 11*p* of the second load balancer 11B supplies the always-on connection establishment request from the communication apparatus 90A to the target node 13B. The processor (not shown) of the target node 13B communicates with the communication apparatus 90A in response to the always-on connection establishment request, thereby performing a process for establishing always-on connection. Thus, the always-on connection between the communication apparatus 90A and the target node 13B is established. In this way, the connection server that performs always-on connection with the communication apparatus 90A is changed from the first connection server 10A to the second connection server 10B.

After the establishment of the always-on connection, in S983, the target node 13B and the communication apparatus 90A maintain the always-on connection by KeepAlive communication. In S986, the second connection server 10B (the load balancer 11B or the target node 13B) transmits result data indicating a result of connection confirmation to the control server 50. In S990, the always-on connection history data 502 (FIG. 1) is updated as in S260 (FIG. 3).

Figure 10:
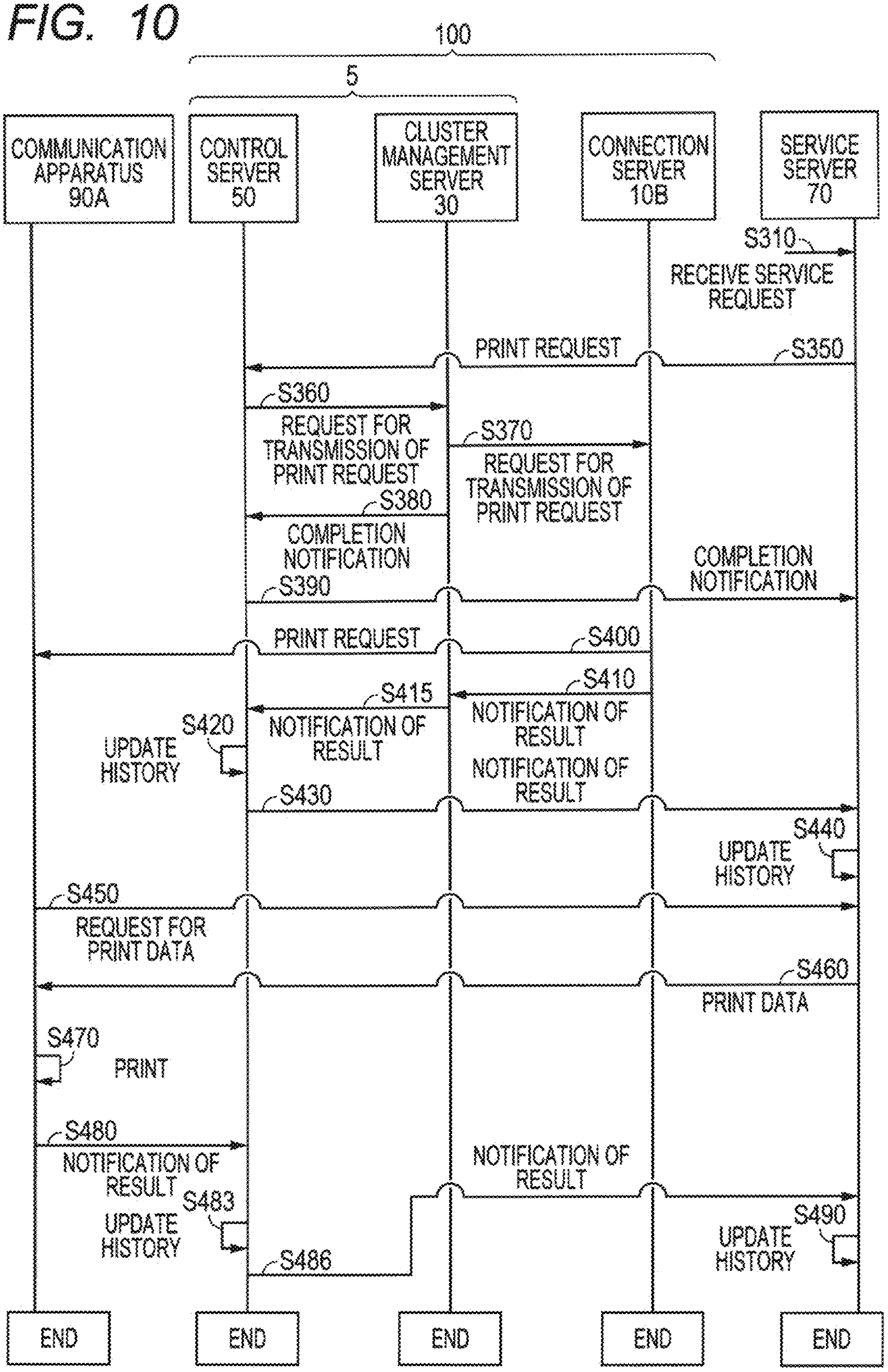
FIG. 10 is a sequence diagram showing an example of a process for using a service.

A3. Service:

FIG. 10 is a sequence diagram showing an example of a process for using a service provided by the service server 70 (FIG. 1). In S310, the service server 70 receives a service request from an external apparatus such as the user terminal 95. Hereinafter, it is assumed that the service request is a request for printing by the first communication apparatus 90A. In the present embodiment, the service request includes data indicating an identifier of a user who uses the service, data indicating that the requested service is remote print, data indicating an identifier of a communication apparatus (the first communication apparatus 90A in this case) to be used for the service, and image data of an image to be printed.

In S350, the processor 70*p* of the service server 70 transmits, to the control server 50, a print request addressed to the first communication apparatus 90A. In this embodiment, the processor 70*p* generates print data for the first communication apparatus 90A by using image data of the image to be printed. The processor 70*p* stores the print data in the non-volatile memory 70*n* and generates a URL (also referred to as a print URL) for accessing the print data. The print request includes data indicating the print URL, a destination identifier that is an identifier of a destination apparatus (here, the first communication apparatus 90A), and a user identifier. The print request is made through an API for remote print provided by the control server 50.

In S360, the processor 50*p* of the control server 50 transmits a request for transmission (transmission request) of the print request to the cluster management server 30. This request includes data indicating the print URL and the destination identifier.

In S370, the processor 30*p* of the cluster management server 30 refers to the cluster apparatus data 302 (FIG. 7) to acquire the cluster identifier associated with the destination identifier. The processor 30*p* transmits the transmission request of the print request to the load balancer 11 of the connection server 10 indicated by the acquired cluster identifier (in this case, the second load balancer 10B of the second connection server 11B) via the management load balancer 20. The transmission request includes data indicating the print URL and the destination identifier. In S380, the processor 30*p* transmits a completion notification to the control server 50. In S390, the processor 50*p* of the control server 50 transmits a completion notification to the service server 70.

In S400, the processor 11p of the second load balancer 11B of the second connection server 10B refers to the allocation data 101 (FIG. 1) and searches for information related to the communication apparatus associated with the destination identifier and the node 13B (referred to as a communication node 13B). The processor 11p transmits a transmission request of the print request to the found communication node 13B. The transmission request includes data indicating the print URL and information related to the communication apparatus (for example, a destination identifier and an IP address). The processor (not shown) of the communication node 13B transmits a print request to the first communication apparatus 90A indicated by the transmission request. The print request includes data indicating the print URL.

In S410, a processor (not shown) of the communication node 13B transmits a transmission result of the print request (for example, success or failure) to the cluster management server 30 via the management load balancer 20. In S415, the processor 30p of the cluster management server 30 transmits the transmission result to the control server 50. In S420, the processor 50p of the control server 50 updates the API history data 501 by using the information acquired in S350 and the transmission result acquired in S415. The API history data 501 indicates a history of use of an API (Application Programming Interface). The API of the target of the history is an API that the server system 100 (here, the control server 50) discloses to the service server 70, and includes an API for requesting a service such as remote print or remote scan. For example, the print request of S350 is made through an API for remote print. The processor 50p adds, for example, data indicating the identifier of the user who has requested a service, the identifier of the communication apparatus, the date and time, and the flag indicating whether communication between the node 13 and the communication apparatus has succeeded or failed, to the API history data 501. In S430, the processor 50p transmits a result notification including information used for updating the API history data 501 to the service server 70. In S440, the processor 70p of the service server 70 updates the history data 702 (FIG. 1). For example, the processor 70p adds, to the history data 702, data indicating the identifier of the user, the identifier of the communication apparatus used for the service, the date and time, and the flag indicating whether the communication between the node 13 and the communication apparatus has succeeded or failed.

In S450, the processor 90p of the first communication apparatus 90A accesses the print URL indicated by the print request and transmits a request for print data. In the present embodiment, the print URL indicates print data stored in the non-volatile memory 70n of the service server 70. In S460, the processor 70p of the service server 70 transmits the print data to the first communication apparatus 90A in response to the request. In S470, the processor 90p of the first communication apparatus 90A controls the print execution unit 90PR in accordance with the print data to print an image by the print execution unit 90PR. In a case where the transmission of the print request of S400 fails, S450 to S470 are omitted.

In S480, the processor 90p of the first communication apparatus 90A transmits a print result to the control server 50. The print result includes, for example, a flag indicating success or failure of printing, the number of printed sheets in a case where printing is successful, and the identifier of the first communication apparatus 90A. In S483, the processor 50p of the control server 50 registers (stores) print information including the print result and the user identifier in the service history data 504. In S486, the processor 50p transmits the print information to the service server 70. In S490, the processor 70p of the service server 70 registers the print information in the history data 702. Then, the process of FIG. 10 ends.

The processor 50p of the control server 50 may determine a job identifier for identifying each service request in response to the service request (for example, S350). The apparatuses 50, 30, 10B, 70, and 90A may further transmit the job identifier when transmitting various information. The apparatuses 50, 30, 10B, 70, 90A perform consistent processes for the service request by referring to the job identifier.

As described above, in the present embodiment, the server system 100 (FIG. 1) is configured to establish always-on connections with the communication apparatuses such as the communication apparatuses 90A and 90B. The server system 100 includes the plurality of connection servers 10, the management load balancer 20, the cluster management server 30, the selection server 40, the control server 50, and the monitoring server 55. As described in FIGS. 3, 8, and 9, the apparatuses 20 to 50 share the processing for controlling the plurality of connection servers 10. Hereinafter, an entirety of the apparatuses 20 to 50 is also collectively referred to as a processing server 5. Each of the plurality of connection servers 10 is an example of a connection server configured to establish always-on connections. The communication apparatuses 90A and 90B are examples of a communication apparatus configured to perform an always-on connection with the connection server.

The processing server 5 performs the following processing. In each of S130 (FIG. 3), S920 and S930 (FIG. 8), the processing server 5 determines the apparatus label information DI of the communication apparatus 90A. As described in FIGS. 2 and 4, the apparatus label information DI represents a combination of the region item GG, the model item GJ, and the target apparatus frequency dGL. The apparatus label information DI is an example of apparatus state information indicating the state of the communication apparatus 90A.

As shown in FIG. 2, server label information SI is associated with each of the plurality of connection servers 10 (and thus the plurality of node clusters 12). The server label information SI represents a combination of the region item GG, the model item GJ, and the monitoring frequency item GL. The server label information SI is an example of server state information indicating the state of the connection server 10.

In S160 (FIG. 3) and S944 (FIG. 8), the processing server 5 determines the target connection server from among the plurality of connection servers 10, by using the apparatus label information DI and the plurality of server label information SI respectively associated with the plurality of connection servers 10. The target connection server is the connection server 10 including the node cluster 12 for the always-on connection with the communication apparatus 90A. In S160 (FIG. 3), the target connection server is determined to be the first connection server 10A, and in S944 (FIG. 8), the target connection server is determined to be the second connection server 10B.

In S210 (FIG. 3) and S970 (FIG. 9), the processing server 5 outputs the cluster URL to the communication apparatus 90A. The cluster URL is an example of connection information for connection with the target connection server 10.

In S916 (FIG. 8), the processing server 5 acquires the request for service update, without receiving an instruction from the communication apparatus 90A. The service update is an example of an update of the state of the communication apparatus 90A. The service update request (indicating one or both of the start service and the stop service in the present embodiment) is an example of update information indicating an update of the state of the communication apparatus 90A.

S920 and S930 (FIG. 8) are performed in a case where update information (here, a request for service update (S916 (FIG. 8))) is acquired after establishment of an always-on connection between the communication apparatus 90A and the target connection server 10A (FIG. 3). In S920 and S930 the processing server 5 determines the updated apparatus label information DI by using the update information.

The determination of the updated target connection server by S944 (FIG. 8) is performed when a particular condition is satisfied (S936: Yes). In S944, the processing server 5 determines that the updated target connection server is the connection server 10B of the second cluster identifier C2 associated with the server label information SI (here, GG1, GJ1, and GLH (FIG. 2)) related to the updated apparatus label information DI.

The output of the cluster URL by S970 (FIG. 9) is performed when a particular condition is satisfied (FIG. 8, S936: Yes). In S970, the processing server 5 outputs the updated cluster URL for connection with the updated target connection server 10B to the communication apparatus 90A.

According to the above configuration, the processing server 5 facilitates the connection (for example, the connection between the second connection server 10B and the first communication apparatus 90A) between the communication apparatus and the connection server associated with the server label information SI (that is, the server state information) related to the updated apparatus label information DI (that is, the apparatus state information) after establishment of an always-on connection.

In the present embodiment, the operation of each of the plurality of connection servers 10 is monitored by the monitoring server 55 at the monitoring frequency (FIG. 2: monitoring frequency item GL) associated with the connection server 10. As shown in FIG. 2, the plurality of connection servers 10 include the plurality of connection servers 10 associated with different monitoring frequencies. The server label information SI (FIG. 2) includes the monitoring frequency item GL. The monitoring frequency item GL is an example of monitoring frequency information associated with the monitoring frequency of the connection server 10. As described in FIG. 4, the apparatus label information DI includes the target apparatus frequency dGL. The target apparatus frequency dGL is an example of target frequency information associated with the target monitoring frequency tGL. In S944 (FIG. 8), the processing server 5 uses the following server label information SI as the server label information SI (FIG. 2) related to the updated apparatus label information DI. That is, the server label information SI includes the monitoring frequency item GL associated with the monitoring frequency higher than or equal to the target monitoring frequency tGL associated with the target apparatus frequency dGL included in the updated apparatus label information DI. For example, in a case where the target apparatus frequency dGL indicated by the apparatus label information DI indicates the low frequency GLL, the server label information SI including the low frequency GLL or the high frequency GLH higher than the low frequency GLL may be used. In a case where the target apparatus frequency dGL indicated by the apparatus label information DI indicates the high frequency GLH, the server label information SI including the high frequency GLH may be used. According to this configuration, the processing server 5 facilitates connection between the communication apparatus and the connection server monitored at an appropriate monitoring frequency.

In the present embodiment, as described with reference to FIG. 4, the apparatus label information DI includes the target apparatus frequency dGL associated with the target monitoring frequency tGL (FIG. 5). The target monitoring frequency tGL is associated with the service item GA. The target apparatus frequency dGL is an example of information associated with a service for using the communication apparatus. In a case where the apparatus label information DI includes information associated with the service, the processing server 5 facilitates connection between the connection server suitable for the service and the communication apparatus.

In the present embodiment, as described in S916, S920, and S930 (FIG. 8), the update information used for determining the apparatus label information DI includes the service update request. The service update request is an example of service update information indicating an update of a service for using the communication apparatus. The processing server 5 determines the apparatus label information DI suitable for service update by using the update information including the service update information.

In the present embodiment, as described in the S130 (FIG. 3) and FIG. 4, the processing server 5 determines the initial apparatus label information DI including the region (here, the region item GG) in which the communication apparatus 90A is used and the model (here, the model item GJ) of the communication apparatus 90A, in order to determine the initial target connection server (here, the first connection server 10A) for the communication apparatus 90A. In S160, the processing server 5 determines the initial target connection server 10A using the plurality of server label information SI (FIG. 2) and the initial apparatus label information DI. In S210, the processing server 5 outputs, to the communication apparatus 90A, initial connection information (here, the cluster URL) for connection with the initial target connection server 10A. In S916 (FIG. 8), the processing server 5 acquires update information including service update information (here, the service update request) indicating an update of a service for using the communication apparatus 90A from the service server 70 that provides the service for using the communication apparatus 90A. In S920 and S930, the processing server 5 determines the updated apparatus label information DI by using the update information including the service update information. As described above, the processing server 5 determines the initial target connection server (the first connection server 10A in FIG. 3) suitable for the region and the model. In a case where the service is updated, the processing server 5 determines the apparatus label information DI suitable for the update of the service. For example, the service update information may indicate a start service, which is a service for which start of use is requested. In this case, the processing server 5 determines the apparatus label information DI suitable for the start service (for example, the apparatus label information DI including the target apparatus frequency dGL indicating the target monitoring frequency tGL of the start service).

In the present embodiment, in S936 (FIG. 8), the processing server 5 compares the updated apparatus label information DI with the apparatus label information DI before the update. The particular condition for determining the updated target connection server includes that the updated apparatus label information DI is different from the apparatus label information DI before the update. In a case where the updated apparatus label information DI is the same as the apparatus label information DI before the update (S936: No), the processing server 5 ends the processing of FIG. 8 without determining the updated target connection server. In a case where the particular condition is satisfied (S936: Yes), the processing server 5 determines the updated target connection server in S944. This reduces the processing load of the processing server 5 compared with a case where the updated target connection server is determined regardless of whether the updated apparatus label information DI is the same as the apparatus label information DI before the update.

In the present embodiment, in a case where the particular condition is satisfied (FIG. 8, S936: Yes), S960 to S963 (FIG. 9) and S970 (FIG. 9) are performed. In S960 to S963 (FIG. 9), the processing server 5 outputs, to the communication apparatus 90A, an instruction to acquire updated connection information (here, the cluster URL) for connection with the updated target connection server 10B from the processing server 5, via the target connection server 10A that establishes an always-on connection with the communication apparatus 90A. In S970, the processing server 5 outputs the updated connection information to the communication apparatus 90A in response to a request for the updated connection information (S966) from the communication apparatus 90A. In this way, the processing server 5 appropriately outputs the connection information to the communication apparatus 90A, in response to the request from the communication apparatus 90A.

FIGS. 8 and 9 show a case in which a request for a service update is made from the user terminal 95 to the service server 70 (S910), and an always-on connection is established between the communication apparatus 90A and the first connection server 10A. In this state, the control server 50 determines whether the system 1000 operates more efficiently by changing the connection server from the first connection server 10A to another connection server due to the service update (that is, whether the label should be changed) (S936). At this time, the communication apparatus 90A does not know whether the connection server has been changed from the first connection server 10A to another connection server, and thus it is difficult to transmit a request to know the change. Thus, in the present embodiment, the communication apparatus 90A is notified, through the always-on connection with the connection server 10A, that the cluster URL has been changed, and the communication apparatus 90A transmits a request for the cluster URL (S966). Although it is conceivable that the control server 50 transmits a notification to the communication apparatus 90A and the communication apparatus 90A performs a process of changing the connection servers, in that case the communication apparatus 90A needs to have a special program for the process of changing the connection servers (changing the cluster URLs). In the present embodiment, the URL acquisition instruction is transmitted (S963) using the already-established always-on connection, and the communication apparatus 90A requests the cluster URL (S966). Thus, for the communication apparatus 90A, the cluster URL is changed by the same process as the process at the registration of the apparatus (FIG. 3), without requiring a special program.

In the present embodiment, the server system 100 (FIG. 1) includes the plurality of connection servers 10 configured to perform always-on connections, and the processing server 5 that determines, from among the plurality of connection servers 10, the target connection server which is the connection server for an always-on connection with the communication apparatus (for example, the communication apparatus 90A). Thus, the server system 100 appropriately facilitates an always-on connection between the communication apparatus and the target connection server.

B. Second Embodiment

FIG. 11 is a schematic diagram showing monitoring frequency data according to a second embodiment. In the present embodiment, monitoring frequency data 402*b* indicates correspondence between a state of each of items GB, GC, and GI and the target monitoring frequency tGL.

The print frequency item GB indicates the number of printed sheets NP by remote print. The unit of the number of printed sheets NP may be, for example, the number of sheets per day. In a case where the number of printed sheets NP is large, the importance of the availability of communication via the connection server 10 is higher than a case where the number of printed sheets NP is small. Thus, the number of printed sheets NP smaller than a threshold NPth is associated with the low frequency GLL, and the number of printed sheets NP greater than or equal to the threshold NPth is associated with the high frequency GLH. The threshold NPth is experimentally determined in advance such that the processing server 5 determines an appropriate target connection server.

The communication frequency item GC indicates an API use frequency F1. The API of the API use frequency F1 is an API for which communication by the node 13 occurs, among the APIs that the server system 100 (here, the control server 50) discloses to the service server 70. For example, the API of the API use frequency F1 is an API for requesting a service such as remote print or remote scan (for example, S310 in FIG. 10). The unit of the API use frequency F1 may be, for example, the number of times of use of the API per day. In a case where the API use frequency F1 is high, the importance of the availability of communication via the connection server 10 is higher than a case where the API use frequency F1 is low. Thus, the API use frequency F1 lower than a threshold F1*th* is associated with the low frequency GLL, and the API use frequency F1 higher than or equal to the threshold F1*th* is associated with the high frequency GLH. The threshold F1*th* is experimentally determined in advance such that the processing server 5 determines an appropriate target connection server.

The use frequency item GI for each user indicates a service use frequency F3 for each user identifier. The unit of the service use frequency F3 may be, for example, the number of times of use of all services per day. In a case where the service use frequency F3 is high, the importance of the availability of communication via the connection server 10 is higher than a case where the service use frequency F3 is low. Thus, the service use frequency F3 lower than a threshold F3*th* is associated with the low frequency GLL, and the service use frequency F3 higher than or equal to or the threshold F3*th* is associated with the high frequency GLH. The threshold F3*th* is experimentally determined in advance such that the processing server 5 determines an appropriate target connection server.

The update process of the connection server using the information NP, F1, and F3 may be various processes. FIG. 12A is a sequence diagram showing an example of an update process using the number of printed sheets NP and the API use frequency F1. S9A is performed instead of S910 to S920 in FIG. 8. After S9A, the processing moves to the S923 (FIG. 8). The processor 50*p* of the control server 50 periodically performs the update process of FIG. 12A for each identifier of the communication apparatus. In S9A, the processor 50*p* acquires the number of printed sheets NP and the API use frequency F1.

The method of acquiring the number of printed sheets NP is as follows, for example. The processor 50*p* of the control server 50 acquires a history of print result associated with the identifier of the communication apparatus by referring to the service history data 504 (FIG. 1). The processor 50*p* acquires a cumulative number of printed sheets and a service use start date by using the history of the print result. The processor 50*p* calculates the number of printed sheets NP by dividing the cumulative number of printed sheets by the number of days from the service use start date to the present.

The method of acquiring the API use frequency F1 is as follows, for example. The processor 50*p* acquires the API use history associated with the identifier of the communication apparatus by referring to the API history data 501 (FIG. 1). The processor 50*p* acquires the cumulative number of times of use and the service use start date by using the API use history. The processor 50*p* calculates the API use frequency F1 by dividing the cumulative number of times of use by the number of days from the service use start date to the present.

The processing subsequent to S9A is similar to the processing in S923 and thereafter in FIGS. 8 and 9. The determination request (S926 (FIG. 8)) includes the information NP and F1. In S930 (that is, the process of FIG. 4), the processor 40*p* of the selection server 40 may adopt, as the target monitoring frequency tGL for determining the apparatus label information DI, the highest target monitoring frequency tGL among the plurality of target monitoring frequencies tGL respectively associated with the plurality of items including the information NP and F1.

FIG. 12B is a sequence diagram showing an example of an update process using the service use frequency F3. S9B1 to S9B3 are performed instead of S910 to S920 in FIG. 8. After S9B3, the processing moves to S923 (FIG. 8). The processor 50*p* of the control server 50 periodically performs the update process of FIG. 12B for each user identifier. The method of acquiring the service use frequency F3 is as follows. In S9B1, the processor 50*p* of the control server 50 requests the service server 70 to transmit a use history of a service associated with the user identifier to be processed. In S9B2, the processor 70*p* of the service server 70 refers to the history data 702 (FIG. 1) to acquire the use history of the service associated with the user identifier, and transmits data indicating the acquired use history to the control server 50. In S9B3, the processor 50*p* of the control server 50 acquires the cumulative number of times of use of the service and the use start date for each service, by using the use history. The processor 50*p* calculates the service use frequency F3 by dividing the cumulative number of times of use by the number of days from the earliest use start date to the present. The processing subsequent to S9B3 is similar to the processing in S923 and thereafter in FIGS. 8 and 9. The determination request (S926 (FIG. 8)) includes the service use frequency F3. In S930 (that is, the process of FIG. 4), the processor 40*p* of the selection server 40 may adopt, as the target monitoring frequency tGL for determining the apparatus label information DI, the highest target monitoring frequency tGL among one or more target monitoring frequencies tGL respectively associated with one or more items including the service use frequency F3. In a case where a plurality of communication apparatuses are associated with the user identifier to be processed, the processor 50*p* may perform the processing in S923 and thereafter for each communication apparatus.

FIG. 12C is a sequence diagram showing an example of an update process using the information NP, F1, and F3. S9C is performed instead of S910 to S920 in FIG. 8. After S9C, the processing moves to S923 (FIG. 8). In this embodiment, the processor 55*p* of the monitoring server 55 periodically collects the number of printed sheets NP, the API use frequency F1, and the service use frequency F3 from other servers (for example, the control server 50 and the service server 70). The processor 55*p* periodically transmits, to the control server 50, data indicating the information NP and F1 of each communication apparatus identifier and the service use frequency F3 of each user identifier. The processing subsequent to S9C is similar to the processing in S923 and thereafter in FIGS. 8 and 9. The processor 50*p* of the control server 50 performs the processing in S923 and thereafter by using the information NP and F1 for each communication apparatus identifier. The processor 50*p* performs the processing in S923 and thereafter by using the service use frequency F3 for each user identifier.

S9A (FIG. 12A) may be added to the processing of FIGS. 8 and 9. The processor 50*p* of the control server 50 may perform S9A in response to the service update request (S916). S9B1 to S9B3 (FIG. 12B) may be added to the processing of FIGS. 8 and 9. The processor 50*p* may perform S9B1 to S9B3 in response to the service update request (S916). S9A (FIG. 12A) may be added to the processing of FIG. 3. The processor 50*p* of the control server 50 may perform S9A in response to the registration request (S110). S9B1 to S9B3 (FIG. 12B) may be added to the processing of FIG. 3. The processor 50*p* may perform S9B1 to S9B3 in response to the registration request (S110). In any case, the determination request (S120 (FIG. 3), S926 (FIG. 8)) may include one or more types of information among the information NP, F1, and F3. One or more types of information arbitrarily selected in advance from the service item GA (FIG. 5) and the information NP, F1, and F3 (FIG. 11) may be used for the connection server update process.

The apparatus label information DI includes the target apparatus frequency dGL associated with the target monitoring frequency tGL (FIGS. 5 and 11). In a case where the target apparatus frequency dGL indicates the target monitoring frequency tGL associated with the number of printed sheets NP, the target apparatus frequency dGL is an example of information associated with the frequency of printing performed using the communication apparatus. In a case where the target apparatus frequency dGL indicates the target monitoring frequency tGL associated with the API use frequency F1, the target apparatus frequency dGL is an example of information associated with the use frequency of the application programming interface (API) for a service by the communication apparatus. In a case where the target apparatus frequency dGL indicates the target monitoring frequency tGL associated with the service use frequency F3, the target apparatus frequency dGL is an example of information associated with the use frequency of the service for using the communication apparatus. In a case where the apparatus label information DI includes such information, the processing server 5 facilitates connection between the communication apparatus and a connection server suitable for the number of printed sheets NP, the API use frequency F1, or the service use frequency F3.

C. Third Embodiment

FIGS. 13 to 15 are schematic diagrams showing items included in label information (here, the server label information SI (FIG. 2) and the apparatus label information DI (FIG. 4)) and methods of acquiring information for determining the items, according to a third embodiment. The label information is not limited to the region item GG (FIG. 2), the model item GJ, and the items indicating the monitoring frequency (here, the monitoring frequency item GL and the target apparatus frequency dGL), and various other items may be used. FIGS. 13 to 15 show eleven items GA to GK as examples of usable items. Each of the drawings shows correspondence among a type of information, an item, an acquisition method, and a determination rule of the cluster label data 301 (FIG. 2). The items GA to GK are classified into five types of "service information", "history information", "connection source information", "user information", and "apparatus specification information". The acquisition method is an example of a method of acquiring information used for determining each item, and is performed in S520 of FIG. 4, for example.

As will be described later, an item determined based on a history related to the communication apparatus may be used as the apparatus label information DI. When the power state of the communication apparatus is switched from an OFF state to an ON state, the communication apparatus starts a process for establishing an always-on connection (FIG. 3). Further, when an always-on connection is disconnected due to a communication error and so on, the communication apparatus starts a process for establishing an always-on connection. Here, a node cluster 12 different from the node cluster 12 allocated in the past may be allocated to the communication apparatus based on the history related to the communication apparatus. The items GA to GK will be described in order below.

C1. Service Item GA:

The service item GA (FIG. 13) is the service item GA described in FIG. 5 and so on. The service item GA is selected from a plurality of services including, for example, a remote print GA1, a remote scan GA2, an information acquisition GA3, and "no service (not shown)". In the service of the remote print GA1, the service server 70 causes the communication apparatus to print an image via the network NT (for example, FIG. 10). In the service of the remote scan GA2, the service server 70 causes a communication apparatus having a reading device (scanner) to scan a target (for example, a document sheet), and transmits the scanned image to a user terminal (for example, the user terminal 95) via the network NT. In the service of the information acquisition GA3, the service server 70 acquires information from the communication apparatus and performs a particular process using the acquired information. For example, in a case where the communication apparatus includes a print execution unit (print engine), the service server 70 acquires remaining amount information indicating the remaining amount of a consumable (color material (for example, ink or toner), print paper, and so on) from the communication apparatus. In a case where the remaining amount is smaller than or equal to a threshold, the service server 70 performs an order process of the consumable.

Figure 16A:
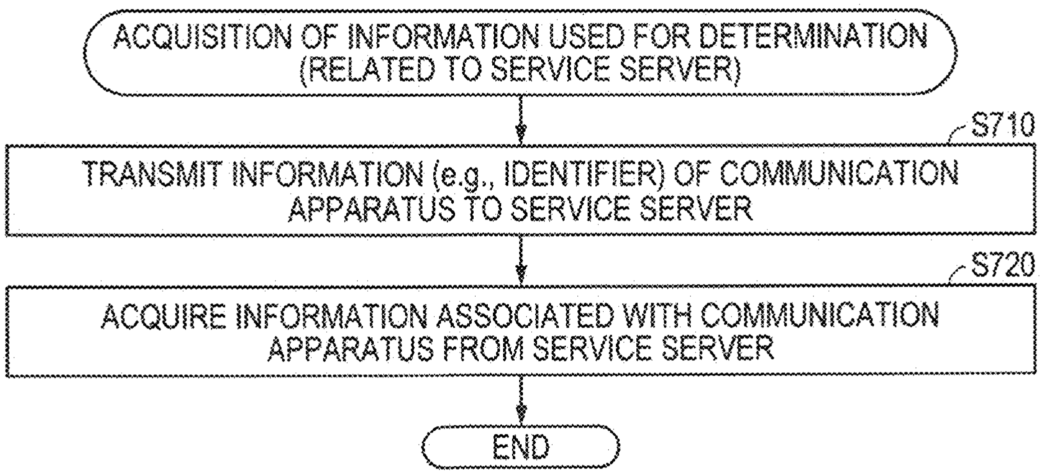
FIGS. 16A and 16B are flowcharts showing examples of an acquisition process.

In S520 of FIG. 4, the processor 40*p* of the selection server 40 may acquire information for determining the service item GA from the service server 70. FIG. 16A is a flowchart showing an example of an acquisition process. In S710, the processor 40*p* of the selection server 40 transmits data indicating the identifier of the communication apparatus to the service server 70. In S720, the processor 70*p* of the service server 70 refers to the service correspondence data 701 (FIG. 1) and acquires the service identifier associated with the identifier of the communication apparatus. The processor 70*p* transmits data of the acquired service identifier to the selection server 40. The processor 40*p* of the selection server 40 determines the service item GA by using the service identifier. Priorities (order) may be assigned to the plurality of usable services in advance. In a case where a plurality of services are associated with the identifier of the communication apparatus, the processor 40*p* may determine the service item GA by using the service indicating the highest priority.

The determination rule of the cluster label data 301 (FIG. 2) may be selected from two rules RA1 and RA2, for example. The first rule RA1 is that a particular service item GA (for example, the remote print GA1 and the remote scan GA2) is associated with a plurality of cluster identifiers. Even in a case where one connection server 10 fails, the service server 70 provides the service of the particular service item GA for the communication apparatuses connected to the other connection servers 10. The other service item GA (for example, information acquisition GA3 and "no service") may also be associated with a plurality of cluster identifiers. Alternatively, the other service item GA may be associated with one cluster identifier. In a case where the connection server 10 fails, the service server 70 provides the service after an always-on connection is restored.

The second rule RA2 is that a cluster identifier that is different for each service is associated with each service. Even in a case where the connection server 10 for one service fails, the service server 70 provides the other services.

The quality of always-on connections may be different among the plurality of connection servers 10. The quality of the connection server 10 may be adjusted to a quality suitable for the corresponding service. For example, the quality of always-on connections of the remote print GA1 and the remote scan GA2 may be higher than the quality of always-on connections of the information acquisition GA3 and "no service". The method of adjusting the quality of always-on connections may be any method. For example, the connection server 10 may include an alternative apparatus of each of the apparatuses 11 and 13. The monitoring server 55 may periodically monitor the connection server 10 (also referred to as health check). In a case where a possibility of abnormality is detected by the health check, the monitoring server 55 may replace the apparatus having the possibility of abnormality with an alternative apparatus. By increasing the frequency of health checks, the quality of always-on connections improves. Further, the quality of always-on connections improves by adjusting the condition of abnormality detection by the health check such that a possibility of abnormality is easily detected. One or both of the frequency of health checks and the condition for abnormality detection may be different among the plurality of connection servers 10. The method of the health check may be any method for detecting a possibility of abnormality. For example, the health check may include one or more processes of transmission of a response request to the load balancer 11, transmission of a response request to each node 13, acquisition of a usage rate of a processor of the load balancer 11, acquisition of a usage rate of a processor of each node 13, acquisition of a usage rate of a memory of the load balancer 11, and acquisition of a usage rate of a memory of each node 13. The condition for abnormality detection may be that any of the following is satisfied: a response is not received within a particular waiting time from transmission of the response request; the usage rate of the processor is higher than or equal to a particular processor threshold; and the usage rate of the memory is higher than or equal to a particular memory threshold. The waiting time, the processor threshold, and the memory threshold may be set for each connection server 10. The processor threshold and the memory threshold may be different between the load balancer 11 and the node 13. In a case where one apparatus includes a plurality of processors, the usage rate of the processor of the apparatus may be various summary statistics (average value, median value, maximum value, and so on) of a plurality of usage rates of the plurality of processors.

C2. Print frequency item GB:

The print frequency item GB is the print frequency item GB described in FIG. 11. The print frequency item GB is selected from, for example, a first group GB1 (the number of printed sheets NP per day is greater than or equal to the particular threshold NPth) and a second group GB2 (the number of printed sheets NP per day is smaller than the threshold NPth).

In S520 of FIG. 4, the processor 40*p* of the selection server 40 may acquire, from the service server 70, information (for example, the number of printed sheets NP or a history of print results) used for determining the print frequency item GB. This acquisition may be performed by the same processing as that in FIG. 16A. The method of calculating the number of printed sheets NP may be the same as the calculation method of FIG. 12A.

The determination rule of the cluster label data 301 (FIG. 2) may be selected from two rules RB1 and RB2, for example. The first rule RB1 is that the first group GB1 is associated with a plurality of cluster identifiers. Even in a case where one connection server 10 fails, the service server 70 performs remote print for communication apparatuses connected to the other connection servers 10. The second group GB2 may also be associated with a plurality of cluster identifiers. Alternatively, the second group GB2 may be associated with one cluster identifier.

The second rule RB2 is that a cluster identifier that is different for each group is associated with each group. Even in a case where the connection server 10 for one group fails, the service server 70 provides service to the other group. The quality of always-on connections may be different among the plurality of connection servers 10. For example, the quality of always-on connections of the first group GB1 may be higher than the quality of always-on connections of the second group GB2.

Figure 16B:
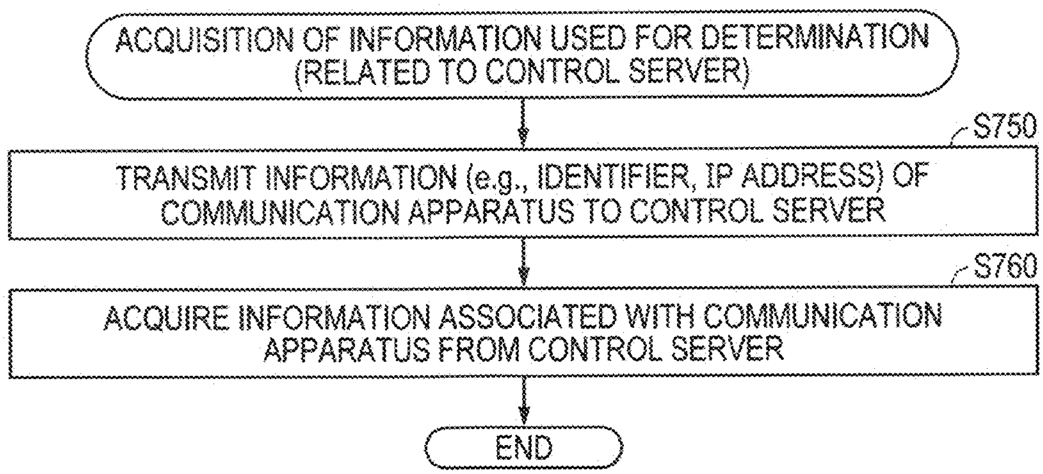

C3. Communication Frequency Item GC:

The communication frequency item GC is the communication frequency item GC described in FIG. 11. The communication frequency item GC is selected from, for example, a first group GC1 (the API use frequency F1 is higher than or equal to the particular threshold F1*th*) and a second group GC2 (the API use frequency F1 is lower than the threshold F1*th*). In S520 of FIG. 4, the processor 40*p* of the selection server 40 may acquire, from the control server 50, information (for example, the API use frequency F1 or the API use history) used for determining the communication frequency item GC. FIG. 16B is a flowchart showing an example of an acquisition process. In S750, the processor 40*p* of the selection server 40 transmits data indicating the identifier of the communication apparatus to the control server 50. In S760, the processor 50*p* of the control server 50 refers to the API history data 501 (FIG. 1) and acquires the API use history associated with the identifier of the communication apparatus. The processor 50*p* transmits data of the acquired use history to the selection server 40. The processor 40*p* of the selection server 40 calculates the API use frequency F1 by using the API use history and determines the communication frequency item GC. The method of calculating the API use frequency F1 may be the same as the calculation method described with reference to FIG. 12A.

The determination rule of the cluster label data 301 (FIG. 2) may be selected from two rules RC1 and RC2, for example. The first rule RC1 is that each of the groups GC1 and GC2 is associated with a plurality of cluster identifiers so as to reduce the deviation of the API use frequency F1 among the plurality of connection servers 10. For example, a plurality of common cluster identifiers are associated with the first group GC1 and the second group GC2.

The second rule RC2 is that a cluster identifier that is different for each group is associated with each group of the communication frequency item GC. Even in a case where the connection server 10 for one group fails, the service server 70 provides the service to the other group. Here, the quality of always-on connections may be different among the plurality of connection servers 10. For example, the quality of always-on connections of the first group GC1 may be higher than the quality of always-on connections of the second group GC2.

C4. Error Frequency Item GD:

The error frequency item GD (FIG. 14) indicates a group of API error frequency FE. The API of the API error frequency FE is the same as the API of the API use frequency F1 (FIG. 13). The error frequency item GD is selected from, for example, a first group GD1 (the API error frequency FE is higher than or equal to a particular threshold FEth) and a second group GD2 (the API error frequency FE is lower than the particular threshold FEth).

In S520 of FIG. 4, the processor 40*p* of the selection server 40 acquires, from the control server, information used for determining the error frequency item GD 50 in accordance with the processing of FIG. 16B. In S750, the processor 40*p* of the selection server 40 transmits data indicating the identifier of the communication apparatus to the control server 50. In S760, the processor 50*p* of the control server 50 prepares information on the API error frequency FE (for example, the cumulative number of times of error and the number of days from the service use start date to the present) from the API use history associated with the identifier of the communication apparatus, by referring to the API history data 501 (FIG. 1). The processor 50*p* then transmits the prepared information to the selection server 40. The processor 40*p* of the selection server 40 calculates the API error frequency FE by referring to the data from the control server 50, and determines the error frequency item GD (for example, FE=the cumulative number of times of error/the number of days).

The determination rule of the cluster label data 301 (FIG. 2) related to the error frequency item GD may be, for example, a rule RD1 described below. The rule RD1 is that the first group GD1 is associated with one or more particular cluster identifiers. According to this configuration, it is highly likely that the cause of the error is ascertained by investigating the specific node cluster 12 corresponding to the particular cluster identifier (for example, the cause is ascertained without investigating the other node clusters 12). The second group GD2 may be associated with one or more cluster identifiers different from the one or more particular cluster identifiers associated with the first group GD1.

C5. Simultaneous Disconnection Item GE:

A simultaneous disconnection item GE (FIG. 14) is an item related to a group of a plurality of IP addresses for which always-on connections were simultaneously disconnected in the past. When a failure occurs in a network device (for example, a router or a gateway) that processes communication from a plurality of IP addresses, always-on connections of the plurality of IP addresses are simultaneously disconnected. When the failure of the network device is solved, establishment requests of always-on connections from the plurality of IP addresses arrive at the server system 100 at the same time.

The simultaneous disconnection item GE is selected from a first group GE1 and a second group GE2, for example. The first group GE1 is a group of a plurality of IP addresses for which always-on connections were simultaneously disconnected in the past. The second group GE2 is a group of IP addresses that are not included in the first group GE1. A simultaneous disconnection condition, which is a condition for an IP address to be included in the first group GE1, may be various conditions. For example, the simultaneous disconnection condition may be that always-on connections of IP addresses greater than or equal to a particular threshold (for example, 100) were disconnected within a particular time width (for example, 10 minutes) in the past.

In S520 of FIG. 4, the processor 40*p* of the selection server 40 acquires, from the control server 50, information used for determining the simultaneous disconnection item GE in accordance with the processing of FIG. 16B. In S750, the processor 40*p* of the selection server 40 transmits data indicating the IP address of the communication apparatus to the control server 50. In S760, the processor 50*p* of the control server 50 generates a list of a plurality of IP addresses that satisfy the simultaneous disconnection condition, by referring to the always-on connection history data 502 (FIG. 1). The processor 50*p* transmits, to the selection server 40, data indicating whether the IP address of the communication apparatus is included in the list of IP addresses. The processor 40*p* of the selection server 40 determines the simultaneous disconnection item GE by referring to the data from the control server 50.

The determination rule of the cluster label data 301 (FIG. 2) related to the simultaneous disconnection item GE may be, for example, a rule REI described below. The rule REI is that the first group GE1 is associated with a plurality of cluster identifiers. The reason for this is as follows. A failure of the network device may occur again after the failure is solved. When the failure that has occurred again is solved, establishment requests for always-on connections from the plurality of IP addresses included in the first group GE1 may arrive at the server system 100 at the same time. In a case where the cluster label data 301 is determined in accordance with the rule REI, the establishment requests of always-on connections from the plurality of IP addresses are distributed to the plurality of node clusters 12. The second group GE2 may be associated with one or more cluster identifiers different from the plurality of cluster identifiers associated with the first group GE1.

C6. Communication Failure Item GF:

A communication failure item GF (FIG. 14) is an item related to a group of a plurality of communication apparatuses in which a communication failure occurred in the past. A plurality of communication apparatuses may be used in the same region. For example, a plurality of communication apparatus may be used in the same product destination. A plurality of communication apparatuses may be provided by a sales company and used in a business region of the sales company. There is a case that always-on connections of a plurality of communication apparatuses used in the same region are easily disconnected. For example, the communication network at a certain product destination may be unstable. The communication network in the business region of a certain sales company may be unstable.

The communication failure item GF is selected from a first group GF1 and a second group GF2, for example. The first group GF1 is a group of communication apparatuses in which a communication failure is likely to occur. The second group GF2 is a group of communication apparatuses that are not included in the first group GF1. In the present embodiment, the identifiers of the plurality of communication apparatuses are divided into a plurality of groups (also referred to as terminal groups) in advance. One terminal group is composed of identifiers of a plurality of communication apparatuses used in the same region. The regions are different, that is, geographical locations are different among the plurality of terminal groups. A failure group condition, which is a condition that a target terminal group is included in the first group GF1, may be various conditions indicating that a communication failure is likely to occur. For example, the failure group condition may be that always-on connections of a particular percentage (for example, 30%) or more of the communication apparatuses included in the target terminal group were disconnected within a particular time width (for example, 10 minutes) in the past.

In S520 of FIG. 4, the processor 40*p* of the selection server 40 acquires, from the control server 50, information used for determining the communication failure item GF in accordance with the processing of FIG. 16B. In S750, the processor 40*p* of the selection server 40 transmits data indicating the identifier of the communication apparatus to the control server 50. In S760, the processor 50*p* of the control server 50 extracts a terminal group that satisfies the failure group condition from among a plurality of terminal groups determined in advance, by referring to the always-on connection history data 502 (FIG. 1). The processor 50*p* transmits, to the selection server 40, data indicating whether the identifier of the communication apparatus is included in the terminal group that satisfies the failure group condition. The processor 40*p* of the selection server 40 determines the communication failure item GF by referring to the data from the control server 50.

The determination rule of the cluster label data 301 (FIG. 2) related to the communication failure item GF may be selected from two rules RF1 and RF2, for example. The first rule RF1 is that the first group GF1 is associated with a plurality of cluster identifiers. The reason for this is as follows. In a region where a communication failure has occurred, the communication failure may occur again. When the communication failure that has occurred again is solved, establishment requests for always-on connections from the plurality of communication apparatuses of the terminal group included in the first group GF1 may arrive at the server system 100 at the same time. In a case where the first rule RF1 is adopted, the establishment requests of always-on connection from the plurality of communication apparatuses are distributed to the plurality of node clusters 12. The second group GF2 may be associated with one or more cluster identifiers different from the plurality of cluster identifiers associated with the first group GF1.

The second rule RF2 is that a cluster identifier that is different for each group is associated with each group of the communication failure item GF. According to this configuration, when a communication failure occurs in the terminal group included in the first group GF1, an influence of the communication failure on the node cluster 12 associated with the second group GF2 is alleviated.

The communication failure item GF may be determined using an IP address instead of the identifier of the communication apparatus.

C7. Region Item GG:

The region item GG (FIG. 14) is the region item GG described in FIG. 3. The region item GG is an item related to a connection source of an always-on connection. The region item GG may be selected from a plurality of regions including, for example, a first region GG1, a second region GG2, and a third region GG3.

In S520 of FIG. 4, the processor 40*p* of the selection server 40 acquires information used for determining the region item GG (here, the identifier of the communication apparatus) by referring to the terminal information data included in the determination request received in S120 (FIG. 3). Instead, the processor 40*p* may acquire information from the control server 50 in accordance with the processing of FIG. 16B. In S750, the processor 40*p* of the selection server 40 transmits information (for example, the identifier, the IP address, and so on) relating to the communication apparatus to the control server 50. In S760, the processor 50*p* of the control server 50 transmits, to the selection server 40, data indicating the region associated with the communication apparatus by using the information related to the communication apparatus. The correspondence between the information on the communication apparatus and the region is determined in advance. The processor 40*p* of the selection server 40 determines the region item GG by referring to the data from the control server 50.

The determination rule of the cluster label data 301 (FIG. 2) for the region item GG may be, for example, a rule RGI described below. The rule RGI is that a cluster identifier that is different for each region is associated with each region of the region item GG. According to this configuration, when a communication failure occurs in one region, an influence of the communication failure on the node cluster 12 associated with another region is alleviated. The region item GG may be determined based on various information related to the region, such as the IP address of the communication apparatus and the business region of the sales company that provides the communication apparatus, instead of the product destination of the communication apparatus.

C8. User Item GH:

A user item GH (FIG. 15) indicates a user associated with the communication apparatus. The user is, for example, an owner of the communication apparatus. The user item GH may be selected from a plurality of user identifiers including a first user identifier GH1 and a second user identifier GH2.

In S520 of FIG. 4, the processor 40*p* of the selection server 40 acquires, from the control server 50, information used for determining the user item GH in accordance with the processing of FIG. 16B. In S750, the processor 40*p* of the selection server 40 transmits data indicating the identifier of the communication apparatus to the control server 50. In S760, the processor 50*p* of the control server 50 acquires the identifier of the user associated with the identifier of the communication apparatus by referring to the user correspondence data 503 (FIG. 1). The processor 50*p* transmits data indicating the identifier of the user to the selection server 40. The processor 40*p* of the selection server 40 determines the user item GH by referring to the data from the control server 50.

The determination rule of the cluster label data 301 (FIG. 2) related to the user item GH may be selected from two rules RH1 and RH2, for example. The first rule RH1 is that one cluster identifier is associated with each user identifier. In a case where a plurality of communication apparatuses are associated with one user identifier, the plurality of communication apparatuses are associated with the same one cluster identifier. According to this configuration, when a failure occurs in one node cluster 12, the number of users affected by the failure is reduced. A plurality of user identifiers may be associated with one cluster identifier.

The second rule RH2 is that a plurality of cluster identifiers are associated with each user identifier. The second rule RH2 is a rule for distributing a plurality of communication apparatuses to a plurality of node clusters 12 in a case where a plurality of communication apparatuses are associated with one user identifier. In S670 of FIG. 6, the processor 30*p* of the cluster management server 30 determines one target node cluster (that is, one target connection server) for each user identifier by round robin. In this case, S665 may be omitted. In a case where the second rule RH2 is used, a possibility that all communication apparatuses associated with one user identifier become unusable due to a failure of one node cluster 12 is reduced.

C9. User Use Frequency Item GI:

A user use frequency item GI (FIG. 15) indicates a group of the service use frequency F3 for each user identifier. The user use frequency item GI is selected from, for example, a first group GI1 (the service use frequency F3 is higher than or equal to the particular threshold F3*th*) and a second group GI2 (the service use frequency F3 is lower than the particular threshold F3*th*).

In S520 of FIG. 4, the processor 40*p* of the selection server 40 acquires, from the service server 70, information used for determining the user use frequency item GI in accordance with the process of FIG. 16A. In S710, the processor 40*p* of the selection server 40 transmits data indicating the identifier of the communication apparatus to the service server 70. In S720, the processor 70*p* of the service server 70 refers to the service correspondence data 701 and acquires the identifier of the user associated with the identifier of the communication apparatus. The processor 70*p* refers to the history data 702 and prepares information related to the user use frequency item GI (for example, the total of the number of times of use of all services and the number of days from the earliest service use start date to the present) from the use history of the service associated with the identifier of the user. The processor 70*p* transmits data indicating the prepared information to the selection server 40. The processor 40*p* of the selection server 40 calculates the service use frequency F3 by referring to the data from the service server 70, and determines the user use frequency item GI (for example, F3=the total of the number of times of use/the number of days).

The determination rule of the cluster label data 301 (FIG. 2) related to the user use frequency item GI may be, for example, a rule RI1 described below. The rule RI1 is that the first group GI1 is associated with one or more particular cluster identifiers, and that the second group GI2 is associated with one or more cluster identifiers that are not included in the one or more particular cluster identifiers associated with the first group GF1. The connection server 10 associated with the particular cluster identifier provides high-quality always-on connection as compared to the other connection servers 10. According to this configuration, in a case where a new communication apparatus is used by a user having a high service use frequency F3, a possibility of a failure of the node cluster 12 due to the load of the always-on connection of the communication apparatus is reduced.

C10. Model Item GJ:

The model item GJ (FIG. 15) is the model item GJ described with reference to FIG. 3. The model item GJ may be selected from a plurality of models including a first model GJ1 and a second model GJ2, for example.

In S520 of FIG. 4, the processor 40p of the selection server 40 acquires information (here, a model name) used for determining the model item GJ by referring to the terminal information data included in the determination request received in S120 (FIG. 3). Alternatively, the processor 40p may acquire information from the control server 50 in accordance with the processing of FIG. 16B. In S750, the processor 40p of the selection server 40 transmits data indicating information (for example, the identifier, the IP address, and so on) relating to the communication apparatuses to the control server 50. In S760, the processor 50p of the control server 50 transmits data indicating the model of the communication apparatus to the selection server 40 by using the information related to the communication apparatus. The correspondence between the information related to the communication apparatus and the model is determined in advance. The processor 40p of the selection server 40 determines the model item GJ by referring to the data from the control server 50.

The determination rule of the cluster label data 301 (FIG. 2) related to the model item GJ may be, for example, a rule RJ1 described below. The rule RJ1 is that a cluster identifier that is different for each model is associated with each model of the model item GJ. The function of the communication apparatus (in particular, the function for always-on connection) may be different among the plurality of models. For example, the communication protocol for always-on connection may be different among the plurality of models. In this case, the node cluster 12 is configured to have a function suitable for the function of the communication apparatus of the corresponding model. In this way, the plurality of node clusters 12 may have functions different from one another. Each model of the model item GJ may be associated with the node cluster 12 having a function suitable for the model.

C11. Version Item GK:

A version item GK (FIG. 15) indicates a version of firmware of the communication apparatus. The version item GK may be selected from a plurality of versions including a first version GK1 and a second version GK2, for example.

In S520 of FIG. 4, the processor 40p of the selection server 40 acquires information used for determining the version item GK (here, the version of the firmware) by referring to the terminal information data included in the determination request received in S120 (FIG. 3).

The determination rule of the cluster label data 301 (FIG. 2) for the version item GK may be, for example, a rule RK1 described below. The rule RK1 is that a cluster identifier that is different for each version is associated with each version of the version item GK. The function of the communication apparatus (in particular, the function for always-on connection) may be different among the plurality of versions. For example, the communication protocol for always-on connection may be different among the plurality of versions. In this case, the node cluster 12 is configured to have a function suitable for the function of the communication apparatus of the corresponding version. In this way, the plurality of node clusters 12 may have functions different from one another. Each version of the version item GK may be associated with the node cluster 12 having a function suitable for the version.

When the update process of FIGS. 8 and 9 is performed, information used for determining the apparatus label information (for example, the terminal information data) may be provided to the selection server 40 by the determination request of S926 (FIG. 8) instead of the determination request of S120 (FIG. 3). The label information may include one or more items arbitrarily selected from the items GA to GK. The options of each item (for example, the first group GB1 and the second group GB2 of the print frequency item GB (FIG. 13)) may be associated with the cluster identifier in accordance with the rule of the corresponding item described above. The apparatus label configuration data 401 (FIG. 1) may be determined in advance to indicate the configuration of the label information (for example, a list of items included in the label information). However, the determination rule of the cluster label data 301 is not limited to the rules of FIGS. 13 to 15, and may be various other rules. For example, a different cluster identifier may be associated with each option of an item regardless of the content of the item.

The apparatus label information DI may include the service item GA (for example, an identifier of a service). In this case, the service item GA is an example of information associated with a service for using the communication apparatus. The apparatus label information DI may include the print frequency item GB (for example, the number of printed sheets NP). In this case, the print frequency item GB is an example of information associated with the frequency of printing performed using the communication apparatus. The apparatus label information DI may include the communication frequency item GC (for example, the API use frequency F1). In this case, the communication frequency item GC is an example of information associated with the use frequency of an application programming interface (API) for a service by the communication apparatus. The apparatus label information DI may include the use frequency item GI (for example, the service use frequency F3). In this case, the use frequency item GI is an example of information associated with the use frequency of a service for using the communication apparatus. The apparatus label information DI may include a plurality of items. In this case, the cluster identifier (FIG. 2) may be associated with a combination of a plurality of options of the plurality of items.

D. Modifications

While the present disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the present disclosure, and not limiting the present disclosure. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

(1) As described above, the procedure (for example, the communication protocol) of the always-on connection between the communication apparatus and the connection server 10 may be different depending on the version of the firmware of the communication apparatus. In this case, the server system 100 may include a plurality of connection servers 10 associated with different procedures of always-on connection. The update process of the connection server due to a firmware update of the communication apparatus may be various processes. For example, the communication apparatus downloads new firmware from a server (not shown). The communication apparatus restarts. The communication apparatus starts operating in accordance with the new firmware. The communication apparatus starts the always-on connection establishment process of FIG. 3. The registration request transmitted in S110 includes data of the version of the new firmware. The processing server 5 allocates the connection server 10 suitable for the new version to the communication apparatus (S160).

The new firmware may be configured to support both a procedure for the firmware before the update (referred to as a first procedure) and a procedure for the new firmware (referred to as a second procedure). In this case, the connection server may be updated as follows, for example. The communication apparatus downloads new firmware from a server (not shown). The communication apparatus restarts. The communication apparatus starts operating in accordance with the new firmware. The communication apparatus establishes an always-on connection with the connection server before the update in accordance with the first procedure. The communication apparatus transmits a notification of the new firmware version to the control server 50. In response to this notification, the control server 50 starts the update process of the connection server (for example, the processing in S923 and thereafter in FIGS. 8 and 9).

(2) The state information including the apparatus state information (for example, the apparatus label information DI) and the server state information (for example, the server label information SI) is not limited to the above-described information (for example, the items GA to GL), and may include various kinds of information. The state information may include, for example, one or more information arbitrarily selected from the following information.

(A) Apparatus specification information representing the specification of the communication apparatus (for example, the number of types of color materials usable for printing, the resolution of the reading device, and details of functions of the communication apparatus).

(B) User information related to the user of the communication apparatus (for example, the user's age, the language setting of the communication apparatus, and so on).

(C) Service information related to the service (for example, the frequency of reading by the reading device, and so on).

(D) History information related to a communication history of the communication apparatus (for example, a cumulative number of times of disconnection of always-on connections).

In any case, the processing server 5 appropriately distributes the plurality of communication apparatuses to the plurality of connection servers 10 by using the apparatus state information and the server state information. One or more information included in the initial apparatus state information for determining the initial connection server 10 may be set to particular initial information. For example, the service item GA (FIG. 13) and the user item GH (FIG. 15) may be set to none.

(3) The update information indicating an update of the state of the communication apparatus may indicate an update of any state of the communication apparatus. For example, the update information may indicate a change in an item included in the apparatus state information (for example, the apparatus label information DI). The updated apparatus state information may be set to information reflecting the change indicated by the update information. As in the embodiments of FIGS. 8, 9, 12B, and 12C, the processing server 5 may acquire the update information from an apparatus (for example, the monitoring server 55, the service server 70, or the communication apparatus) different from the processing server 5. Further, as in the embodiment of FIG. 12A, the processing server 5 may acquire the update information without accessing an apparatus different from the processing server 5. In any case, the processing server 5 may acquire the update information without receiving an instruction from the communication apparatus. Thus, the processing server 5 determines the apparatus state information (and update the connection server) independently of the communication apparatus.

(4) The particular condition for determining the updated connection server is not limited to the condition of S936 (FIG. 8), and may be any condition. For example, the particular condition may include that permission is acquired by an administrator of the server system 100. The administrator may permit an update of the connection server, for example, in a case where the server system 100 does not have a failure. The administrator may prohibit an update of the connection server in a case where the server system 100 has a failure.

(5) The method of outputting the updated cluster URL (more generally, the updated connection information) to the communication apparatus may be various other methods instead of the method described in S956 to S970 of FIG. 9. For example, the processing server 5 may output the updated cluster URL to the communication apparatus 90A by S960 and S963, without receiving a request for the cluster URL from the communication apparatus 90A. The communication apparatus 90A may perform S973 in response to receiving the cluster URL. The connection information is not limited to the URL, and may be various information for connection with the connection server (for example, information indicating a destination on the network, such as an IP address).

(5') The process of acquiring information used for determining the apparatus label information may be various processes instead of the process of referring to information included in the registration request of S110 (FIG. 3), the process of referring to information included in the request of S916 (FIG. 8), and the processes of FIGS. 12A to 12C. For example, the processor 40*p* of the selection server 40 may request the communication apparatus to transmit information related to the communication apparatus.

(6) The process of determining the target monitoring frequency tGL associated with the target apparatus frequency dGL of the apparatus label information DI may be various other processes instead of the processes described with reference to FIGS. 5 and 11. For example, a correspondence between the model of the communication apparatus and the target monitoring frequency tGL may be determined in advance. The processor 50*p* of the control server 50 may adopt the target monitoring frequency tGL associated with the model of the communication apparatus.

(7) The connection information used in S665 and S670 of FIG. 6 is not limited to the number of established always-on connections with the connection server 10, and may indicate various connection states of the connection server 10. For example, the connection information may indicate the load of the connection server 10. In S670, the processor 30*p* may select one node cluster 12 (that is, one connection server 10) so as to reduce the deviation of the load among the N candidate clusters. The load of the connection server 10 may be evaluated using, for example, one or both of the total usage rate of the processor and the total usage rate of the memory. The total usage rate of the processor may be various summary statistics (such as an average value, a median value, and a maximum value) of the plurality of processor usage rates of the plurality of nodes 13. The total usage rate of the memory may be various summary statistics (such as an average value, a median value, and a maximum value) of the plurality of memory usage rates of the plurality of nodes 13. In S670, one node cluster 12 may be selected from the N candidate clusters by round robin. In this case, S665 may be omitted. In the S230 of FIG. 3, the processor 11*p* of the load balancer 11 may select one node 13 so as to reduce the deviation of the load among the plurality of nodes 13. Alternatively, one node 13 may be selected by round robin.

(8) The process for establishing an always-on connection is not limited to the above processes (for example, FIGS. 3, 8, 9, 12A, 12B, and 12C), and may be various other processes. For example, the processor 30*p* of the cluster management server 30 may transmit the cluster URL to the control server 50 in S170 (FIG. 3). In response to receiving the cluster URL in S170, the processor 50*p* of the control server 50 may transmit the cluster URL to the communication apparatus 90A. In this case, S180 to S210 may be omitted.

(9) The configuration of the processing server 5 may be various other configurations instead of the configuration of FIG. 1. For example, the total number of nodes 13 included in one connection server 10 may be one or more. In a case where the total number of nodes 13 is one, the load balancer 11 may be omitted from the connection server 10. The node 13 may be configured by a dedicated hardware circuit such as an application specific integrated circuit (ASIC) instead of a computer. Other apparatuses of the server system 100 (for example, the apparatuses 11, 20, 30, 40, 50, 55) may be similarly configured by a dedicated hardware circuit. The functions of two or more apparatuses included in the processing server 5 may be performed by one apparatus. For example, the cluster management server 30 may have the function of the management load balancer 20, and the management load balancer 20 may be omitted. The control server 50 may have the function of the selection server 40, and the selection server 40 may be omitted. The processing server 5 may be configured by one server. The monitoring server 55 may be omitted.

In each of the embodiments described above, a part of the configuration realized by hardware may be replaced by software, and conversely, a part or all of the configuration realized by software may be replaced by hardware.

In a case where a part or all of the functions of the present disclosure are realized by a computer program, the program may be provided in a form stored in a computer-readable storage (recording) medium (for example, a non-transitory computer-readable storage medium). The program may be used in a state of being stored in the same storage medium as that at the time of provision or a different storage medium (computer-readable storage medium). The "computer-readable storage medium" is not limited to a portable storage medium such as a memory card or a CD-ROM, and may include an internal storage device in a computer such as various ROMs or an external storage device connected to a computer such as a hard disk drive.

What is claimed is:

1. A processing server comprising:

a communication interface configured to connect to a network; and a controller configured to perform:

determining apparatus state information indicating a state of a communication apparatus connected to the network;

determining a target connection server from among a plurality of connection servers by using the apparatus state information and a plurality of server state information, the target connection server being a connection server for an always-on connection with the communication apparatus, the plurality of server state information indicating states of respective ones of the plurality of connection servers, the plurality of server state information being associated with respective ones of the plurality of connection servers;

outputting, to the communication apparatus, connection information for connection with the target connection server;

acquiring update information indicating an update of the state of the communication apparatus, without receiving an instruction from the communication apparatus;

in response to acquiring the update information after establishment of the always-on connection between the communication apparatus and the target connection server, determining updated apparatus state information by using the update information; and in a case where a particular condition is satisfied, determining an updated target connection server from among the plurality of connection servers by using the updated apparatus state information and the plurality of server state information, the updated target connection server being a connection server associated with related server state information, the related server state information being one of the plurality of server state information related to the updated apparatus state information; and outputting, to the communication apparatus, updated connection information for connection with the updated target connection server, wherein the apparatus state information includes target frequency information associated with a target monitoring frequency; and wherein the controller is configured to perform:

determining the updated target connection server by using, as the related server state information related to the updated apparatus state information, one of the plurality of server state information including monitoring frequency information associated with a monitoring frequency higher than or equal to the target monitoring frequency associated with the target frequency information included in the updated apparatus state information.

2. The processing server according to claim 1, wherein an operation of each of the plurality of connection servers is monitored by a monitoring server at the monitoring frequency associated with a corresponding connection server;

wherein the plurality of connection servers include a plurality of connection servers associated with different monitoring frequencies; and wherein each of the plurality of server state information includes the monitoring frequency information associated with the monitoring frequency of the corresponding connection server.

3. The processing server according to claim 1, wherein the apparatus state information includes at least:

information associated with a service for using the communication apparatus;

information associated with a frequency of printing that is performed by using the communication apparatus;

information associated with a use frequency, by the communication apparatus, of an application programming interface (API) for a service; or information associated with a use frequency of a service for using the communication apparatus.

4. The processing server according to claim 1, wherein the update information includes service update information indicating an update of a service for using the communication apparatus; and wherein the controller is configured to perform:

determining the updated apparatus state information by using the service update information.

5. The processing server according to claim 1, wherein the controller is configured to perform:

determining initial apparatus state information including a region in which the communication apparatus is used and a model of the communication apparatus, for determining an initial target connection server for the communication apparatus;

determining the initial target connection server by using the plurality of server state information and the initial apparatus state information;

outputting, to the communication apparatus, initial connection information for connection with the initial target connection server;

acquiring update information from a service server that provides a service for using the communication apparatus, the update information including service update information indicating an update of the service for using the communication apparatus; and determining the updated apparatus state information by using the update information including the service update information.

6. The processing server according to claim 1, wherein the particular condition includes that the updated apparatus state information is different from apparatus state information before the update;

wherein the controller is configured to perform:

comparing the updated apparatus state information with the apparatus state information before the update; and in a case where the updated apparatus state information is same as the apparatus state information before the update, not determining the updated target connection server; and in a case where the particular condition is satisfied, determining the updated target connection server.

7. The processing server according to claim 1, wherein the controller is configured to perform:

in a case where the particular condition is satisfied, outputting an acquisition instruction to the communication apparatus via the target connection server for which the always-on connection is established with the communication apparatus, the acquisition instruction being an instruction to acquire, from the processing server, the updated connection information for the connection with the updated target connection server; and outputting the updated connection information to the communication apparatus in response to a request for the updated connection information from the communication apparatus.

8. The processing server according to claim 1, wherein the controller is configured to perform:

in a case where the communication apparatus is neither used for a remote print service nor a remote scan service, allocating the communication apparatus to a first connection server, the first connection server being monitored by a monitoring server at a first monitoring frequency; and in a case where the communication apparatus is used for at least the remote print service or the remote scan service, allocating the communication apparatus to a second connection server, the second connection server being monitored by the monitoring server at a second monitoring frequency higher than the first monitoring frequency.

9. The processing server according to claim 1, wherein the controller is configured to perform:

in a case where the communication apparatus is used at a first print frequency lower than a threshold by remote print, allocating the communication apparatus to a first connection server, the first connection server being monitored by a monitoring server at a first monitoring frequency; and in a case where the communication apparatus is used at a second print frequency higher than the threshold by remote print, allocating the communication apparatus to a second connection server, the second connection server being monitored by the monitoring server at a second monitoring frequency higher than the first monitoring frequency.

10. The processing server according to claim 1, wherein the controller is configured to perform:

regarding a group of a plurality of IP addresses for which always-on connections were simultaneously disconnected or communication failures occurred in a past, allocating the group to a plurality of connection servers.

11. A server system comprising:

a plurality of connection servers configured to perform always-on connections; and a processing server comprising a controller configured to perform:

determining apparatus state information indicating a state of a communication apparatus;

determining a target connection server from among the plurality of connection servers by using the apparatus state information and a plurality of server state information, the target connection server being a connection server for an always-on connection with the communication apparatus, the plurality of server state information indicating states of respective ones of the plurality of connection servers, the plurality of server state information being associated with respective ones of the plurality of connection servers;

outputting, to the communication apparatus, connection information for connection with the target connection server;

acquiring update information indicating an update of the state of the communication apparatus, without receiving an instruction from the communication apparatus;

in response to acquiring the update information after establishment of the always-on connection between the communication apparatus and the target connection server, determining updated apparatus state information by using the update information; and in a case where a particular condition is satisfied, determining an updated target connection server from among the plurality of connection servers by using the updated apparatus state information and the plurality of server state information, the updated target connection server being a connection server associated with related server state information, the related server state information being one of the plurality of server state information related to the updated apparatus state information; and outputting, to the communication apparatus, updated connection information for connection with the updated target connection server, wherein the apparatus state information includes target frequency information associated with a target monitoring frequency; and wherein the controller is configured to perform:

determining the updated target connection server by using, as the related server state information related to the updated apparatus state information, one of the plurality of server state information including monitoring frequency information associated with a monitoring frequency higher than or equal to the target monitoring frequency associated with the target frequency information included in the updated apparatus state information.

12. A method of outputting information to a communication apparatus, the method comprising:

determining apparatus state information indicating a state of the communication apparatus;

determining a target connection server from among a plurality of connection servers by using the apparatus state information and a plurality of server state information, the target connection server being a connection server for an always-on connection with the communication apparatus, the plurality of server state information indicating states of respective ones of the plurality of connection servers, the plurality of server state information being associated with respective ones of the plurality of connection servers;

outputting, to the communication apparatus, connection information for connection with the target connection server;

acquiring update information indicating an update of the state of the communication apparatus, without receiving an instruction from the communication apparatus;

in response to acquiring the update information after establishment of the always-on connection between the communication apparatus and the target connection server, determining updated apparatus state information by using the update information; and in a case where a particular condition is satisfied, determining an updated target connection server from among the plurality of connection servers by using the updated apparatus state information and the plurality of server state information, the updated target connection server being a connection server associated with related server state information, the related server state information being one of the plurality of server state information related to the updated apparatus state information; and outputting, to the communication apparatus, updated connection information for connection with the updated target connection server, wherein the apparatus state information includes target frequency information associated with a target monitoring frequency; and wherein the determining the updated target connection server includes determining the updated target connection server by using, as the related server state information related to the updated apparatus state information, one of the plurality of server state information including monitoring frequency information associated with a monitoring frequency higher than or equal to the target monitoring frequency associated with the target frequency information included in the updated apparatus state information.

* * * * *